United States Patent [19]

Sakaue

[11] Patent Number: 6,052,489
[45] Date of Patent: Apr. 18, 2000

[54] IMAGE OUTPUT APPARATUS AND METHOD

[75] Inventor: Eiichi Sakaue, Kanagawa-ken, Japan

[73] Assignee: Kabushiki Kaisha Toshiba, Kawasaki, Japan

[21] Appl. No.: 08/971,698

[22] Filed: Nov. 17, 1997

[30] Foreign Application Priority Data

Nov. 18, 1996 [JP] Japan ...................................... 8-306240

[51] Int. Cl.$^7$ ........................................................ G06K 9/40
[52] U.S. Cl. ........................... 382/266; 382/199; 382/205; 382/254
[58] Field of Search ..................................... 382/266, 254, 382/242, 269, 264, 195, 205, 199; 358/447, 448, 455, 456, 458, 464

[56] References Cited

U.S. PATENT DOCUMENTS

| | | |
|---|---|---|
| 4,847,641 | 7/1989 | Tung . |
| 5,134,495 | 7/1992 | Frazier et al. . |
| 5,515,179 | 5/1996 | Yamakawa et al. ..................... 382/254 |
| 5,815,605 | 9/1998 | Koike ....................................... 382/269 |

FOREIGN PATENT DOCUMENTS 7-137339  5/1995  Japan .

OTHER PUBLICATIONS

U.S. application No. 08/308,429, Sakave et al., filed Sep. 1994.

Primary Examiner—Thomas D Lee
Attorney, Agent, or Firm—Finnegan, Henderson, Farabow, Garrett & Dunner, L.L.P.

[57] ABSTRACT

In the image output apparatus of the present invention, a window forming section extracts a window including a notice pixel from bit map data of the image. A contour extraction section extracts contour pixels from the window based on the position of the notice pixel. An outline estimation section estimates an outline based on positions of the contour pixels. A smoothing signal generation section generates a smoothing signal for the notice pixel based on the relative position of the notice pixel and the outline.

24 Claims, 24 Drawing Sheets

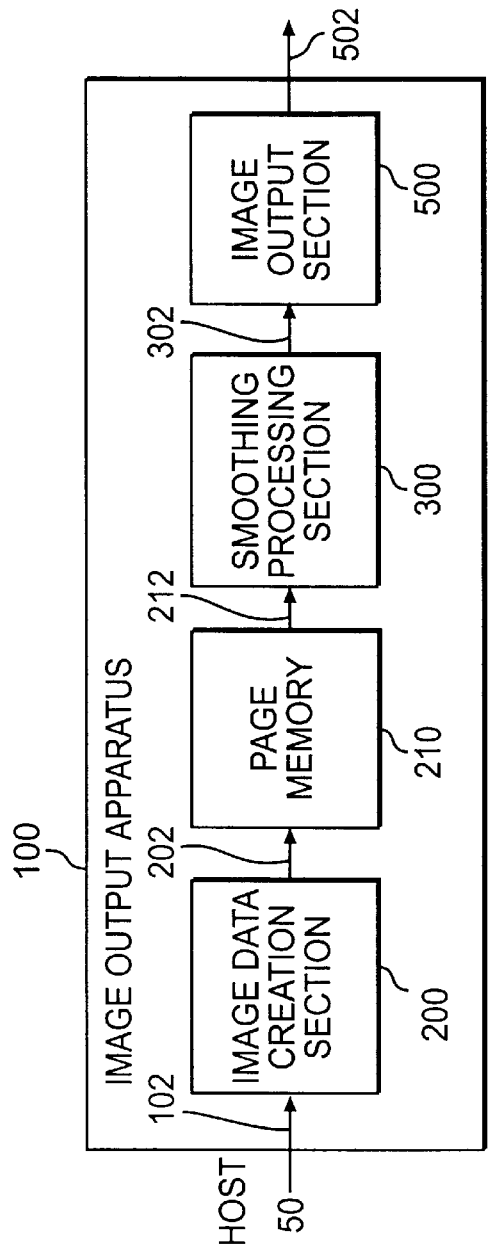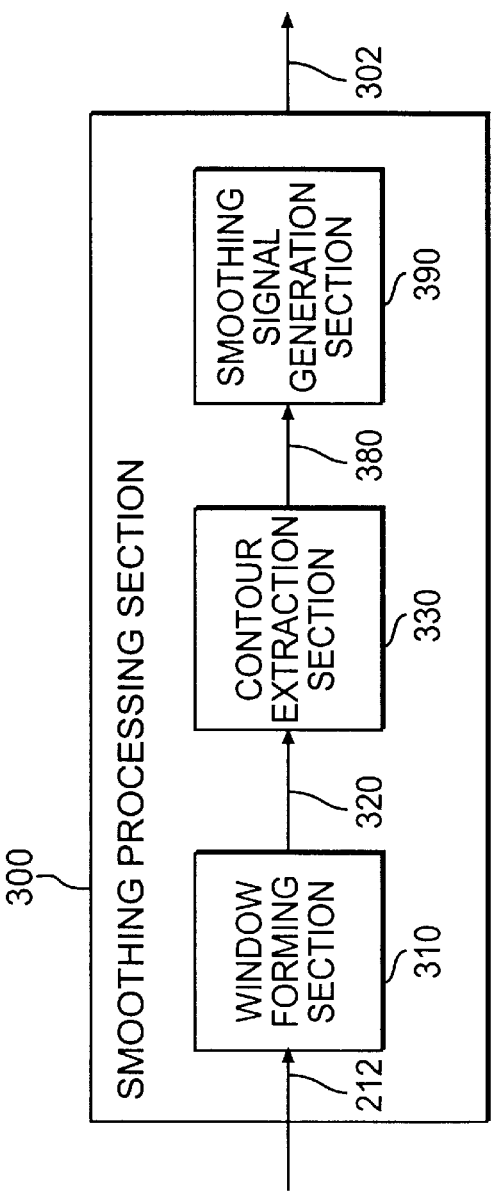

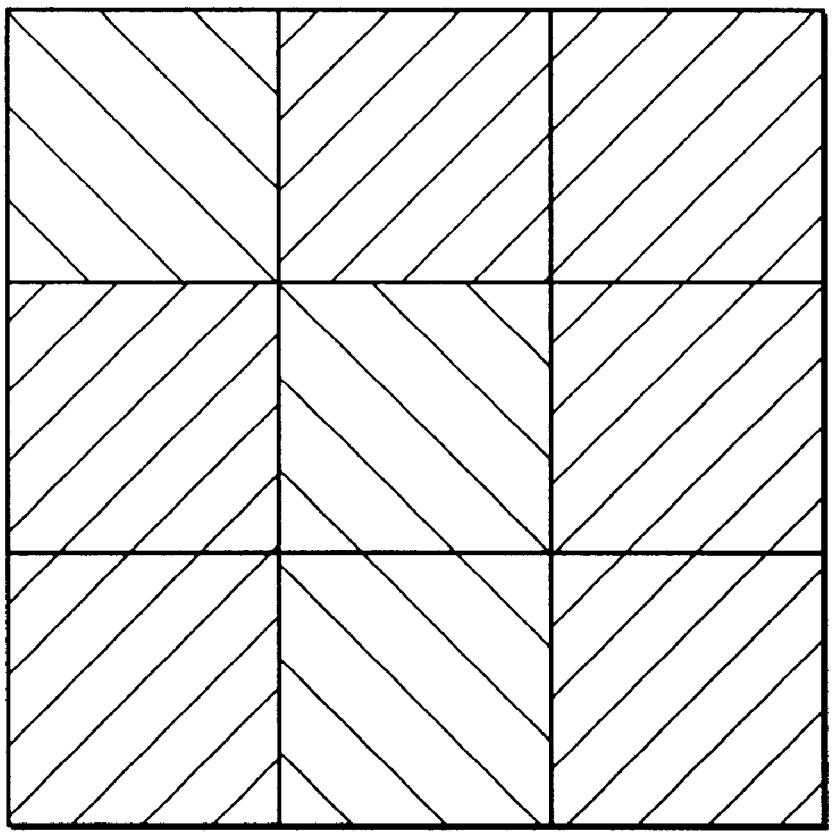
 BLACK PIXEL  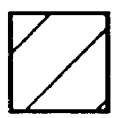 WHITE PIXEL  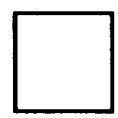 BLACK OR WHITE PIXEL
FIG. 10

FIG. 16

IMAGE OUTPUT APPARATUS AND METHOD

FIELD OF THE INVENTION

The present invention relates to an image output apparatus and a method to output an image in which a smoothing processing is executed or pixel density is converted for bit map image data.

BACKGROUND OF THE INVENTION

An image output apparatus such as a printer or a CRT forms an image by a set of small pixels. The pixel is normally outputted at a fixed position on a lattice matrix. Therefore, the image of pixels is not represented with accuracy below the interval of the lattice. For example, if an almost perpendicular obligue line 20 is outputted as shown in FIG. 1, noise called jag appeares. The reciprocal number of the lattice interval D30 is called resolution, which is used as the estimation value of the ability of the apparatus to represent images. If the resolution is high, jag noise is decreased. However, in this case, the number of pixels 10 and the amount of data increase. Therefore, cost is high and output speed is low.

As a method to decrease the jag noise without high resolution, a smoothing technique is used. As shown in FIG. 2, smoothing is a technique to smooth a contour by outputting the pixel 40 whose size and position are modulated. However, because of the cost and time required to process pixel data, each pixel of data in the image output apparatus is processed by binary bit map data. Pixel modulated information such as multivalue bit map data is not included in this case. Therefore, in the case of smoothing, it is necessary to generate the smoothing signal of the multivalue pixel modulation data from the binary bit map data.

As a general method to generate the smoothing signal, it is generated by the binary bit map data neighboring the notice pixel to be modulated. The character and line image have characteristics which make the contour continuously smooth. The pixel modulation data and the neighboring data to decrease the jag noise correlate mutually. By using these characteristics, the modulation signal is generated.

As a prior method to recognize the neighboring binary bit map data and calculate the pixel modulation data of the notice pixel, template matching is widely used (Japanese Patent Disclosure (Kokai) H2-112966). In this method, a binary template pattern is matched with a neighboring binary template pattern including the notice pixel of the original image to recognize the neighboring pattern information. The smoothing signal is previously set as the output of each template.

Furthermore, a method to determine the intensity modulation signal by calculating outline information from a bit map image is disclosed in Japanese Patent Disclosure (Kokai) H7-137339. However, this method is not practical because the method to calculate concrete outline information is not disclosed.

Recently, it often happens that image data of various kinds of bit map formats with digitized images is sent to the image output apparatus. However, the density of the image data is sometimes different from that of the image output apparatus. When the image whose resolution is different from the image output apparatus is outputted, the size of the output image is different from the original image size. For example, the image whose resolution is 200 dpi (dot per inch) is outputted through the printer whose resolution is 600 dpi, the image size becomes ⅓ of the original. In order to solve this problem, resolution conversion is used. Concretely speaking, in case the resolution of the image output apparatus is higher than the resolution of the original image, each pixel size of the original image is enlarged. In the reverse case, these are thinned-out. However, in case of enlargement by SPC method, the jag noise is clearly enlarged. Therefore, the enlargement technique of smoothing the contour by using template matching is used.

In the prior method to generate the smoothing modulation signal by the template matching pattern or to convert the resolution, the pattern to convert the modulation signal or the resolution is limited to the number of templates which the designer previously prepared. Therefore, an arbitrary pattern or arbitrary resolution of the image is not coped with and the image quality deteriorates. In order to solve this problem, a large number of templates are prepared and the cost becomes high. Similarly, in a method to calculate the outline of the contour, the processing is complicated and can take a long time.

SUMMARY OF THE INVENTION

It is an object of the present invention to provide an image output apparatus and a method which is able to output high quality image by simple processing.

According to the present invention, there is provided an image output apparatus, comprising: contour extraction means for extracting contour pixels from image data; outline estimation means for estimating an outline based on positions of the contour pixels; and smoothing signal generation means for generating a smoothing signal for a notice pixel based on the relative position of the notice pixel and the outline.

Further in accordance with the present invention, there is also provided an image output apparatus, comprising: contour extraction means for extracting contour pixels from image data; outline estimation means for estimating an outline based on positions of the contour pixels; and pixel density conversion means for converting the pixel density of the image data, and for generating signals of each notice pixel based on the relative position of converted notice pixels and the outline.

Further in accordance with the present invention, there is also provided a data processing method to output an image, comprising the steps of: extracting contour pixels from the image data; estimating an outline based on positions of the contour pixels; and generating a smoothing signal for a notice pixel based on the relative position of the notice pixel and the outline.

Further in accordance with the present invention, there is also provided a data processing method to output an image, comprising the step of: extracting contour pixels from the image data; estimating an outline based on positions of the contour pixels; converting the pixel density of the image data; and generating signals of each notice pixels based on the relative position of converted notice pixels and the outline.

BRIEF DESCRIPTION OF THE DRAWINGS

FIG. 3 is a block diagram of the image output apparatus according to the present invention.

FIG. 4 is a block diagram of the smoothing processing section in the image output apparatus according to the present invention.

FIG. 10 is a bit pattern to be matched with the pattern example in FIG. 9.

FIG. 16 is a schematic diagram of a priority order of tracing the contour pixel.

DETAILED DESCRIPTION OF THE PREFERRED EMBODIMENT

Figure 1:
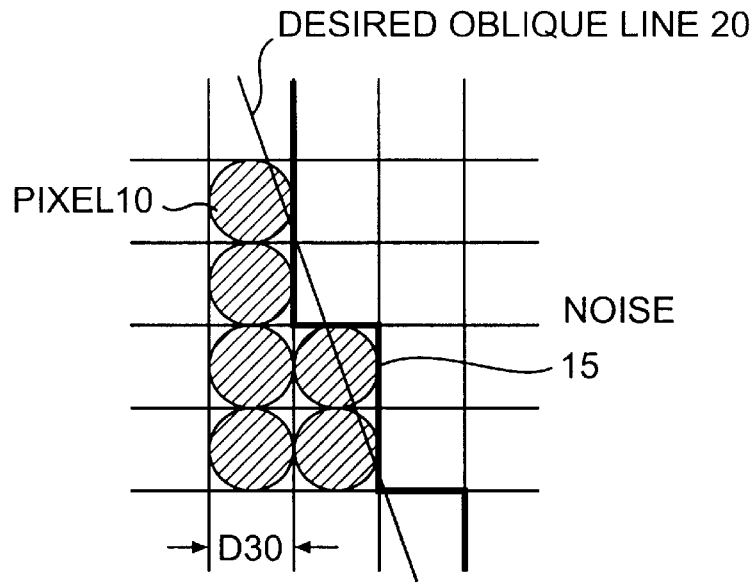
FIG. 1 is a schematic diagram of generation of jag-noise in image.
Figure 2:
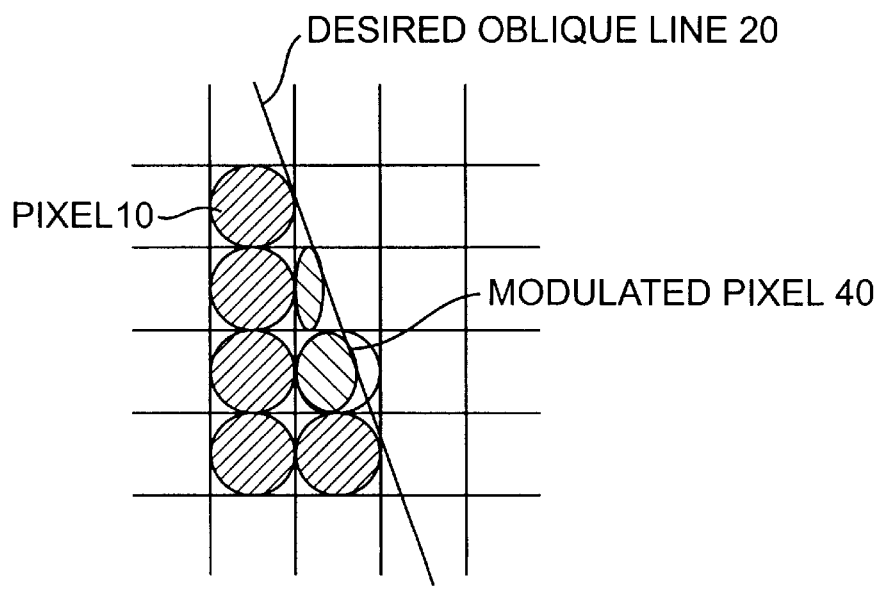
FIG. 2 is a schematic diagram of smoothing to eliminate the jag-noise according to the prior art.

FIG. 3 is a block diagram of the image output apparatus according to the first embodiment of the present invention. In this case, a printer is used as an example. However, the image output apparatus is defined as a general concept including the image printing apparatus and the image display apparatus. The present invention is applied for the image printing apparatus such as digital copy machine and the image display apparatus except for the printer. A process according to the present invention may be performed by a digital or analog computer. The image data may represent physical objects or events.

As shown in FIG. 3, the image output apparatus 100 is comprised of an image data creation section 200, a page memory 210, a smoothing processing section 300 and an image output section 500. The image data creation section 200 receives the image data 102 of character code and figure code from a host 50, and converts it to bitmap image data 202. The bitmap image data is temporarily stored in the page memory 210. In case the image data 102 is already in bit map format such as image inputted by a scanner or a digital camera, the image data 102 is sent to the page memory 210 as the bitmap image data 202. When all image data 102 is converted to the bitmap image data 202 and sent to the page memory 210, the content of the page memory 210 is orderly read as serial bit map data 212 from a corner of the page and sent to the smoothing processing section 300. The smoothing processing section 300 converts the serial bit map data 212 to the smoothing signal 302 and sends it to the image output section 500. The image output section 500 outputs the smoothing signal 302 by an output image 502.

Figure 5:
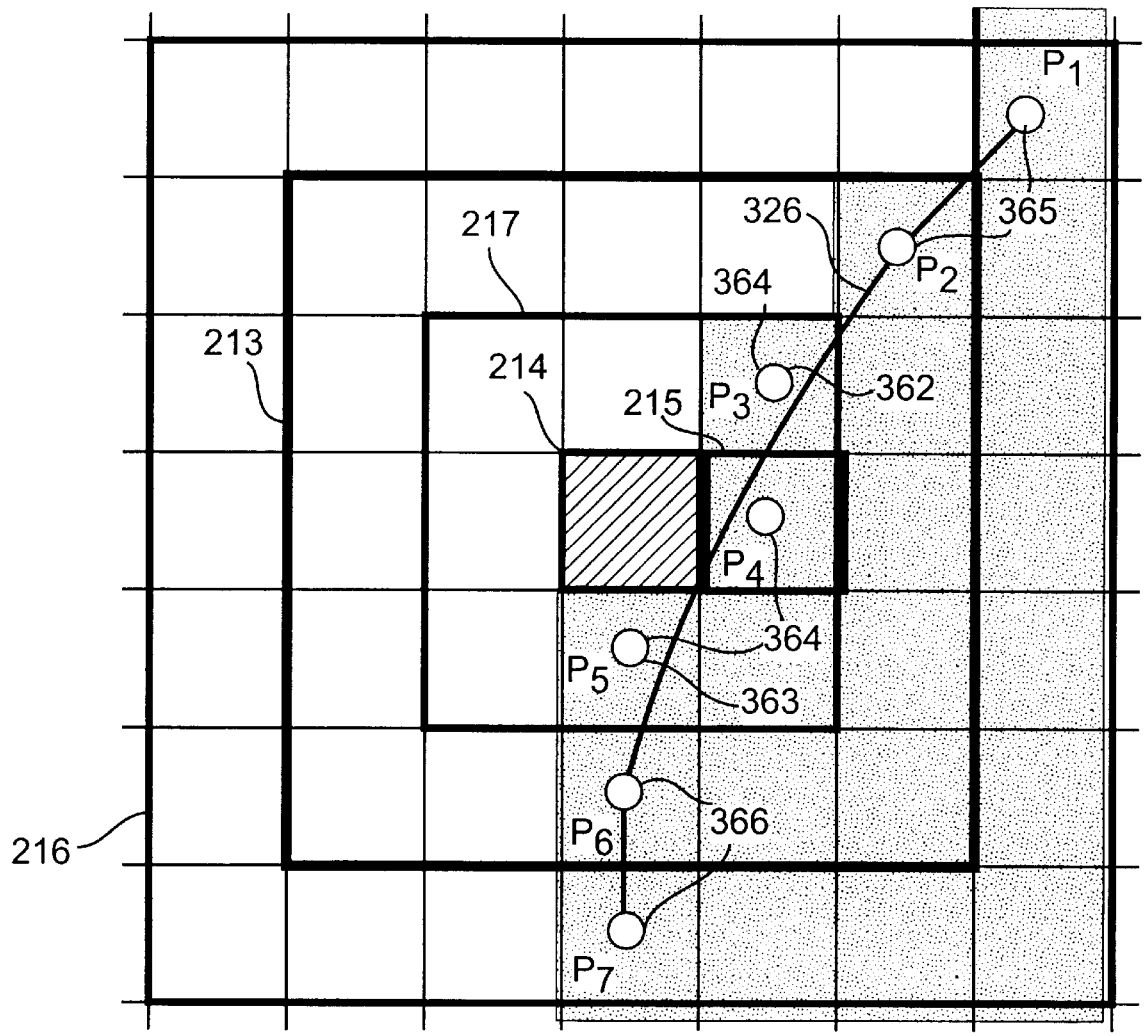
FIG. 5 is a schematic diagram of contour extraction from the bit map image according to the present invention.

FIG. 4 is a block diagram of the smoothing processing section 300 in FIG. 3. The smoothing processing section 300 is comprised of a window forming section 310, a contour extraction section 330 and a smoothing signal generation section 390. The serial bit map data 212 is temporarily stored in the window forming section 310. FIG. 5 is a schematic diagram of contour extraction from the bit map image according to the present invention. As shown in FIG. 5, a window 216 of (M×M) pixels (in FIG. 5, M=7) whose center is a notice pixel 214 is extracted. Whenever the serial bit map data 212 is sent sequentially, the window 216 is shifted to the right by one pixel and the notice pixel 214 at center of the window 216 is shifted to the right neighboring pixel 215. When the window 216 is shifted to the right edge on one line, the window 216 is moved to the left edge the line below. A partial bit map signal 320 of the window 216 is sent to the contour extraction section 330. The contour extraction section 330 extracts contour pixels ($P_1$~$P_M$) neighboring the notice pixel 214 and sends coordinates of the contour pixels 380 {$(x_1, y_1)$~$(x_M, y_M)$} to the smoothing signal generation section 390. The smoothing signal generation section 390 estimates an outline 326 from the coordinates of the contour pixels 380 and generates the smoothing signal 302 of the notice pixel 214 from the outline 326.

Figure 6:
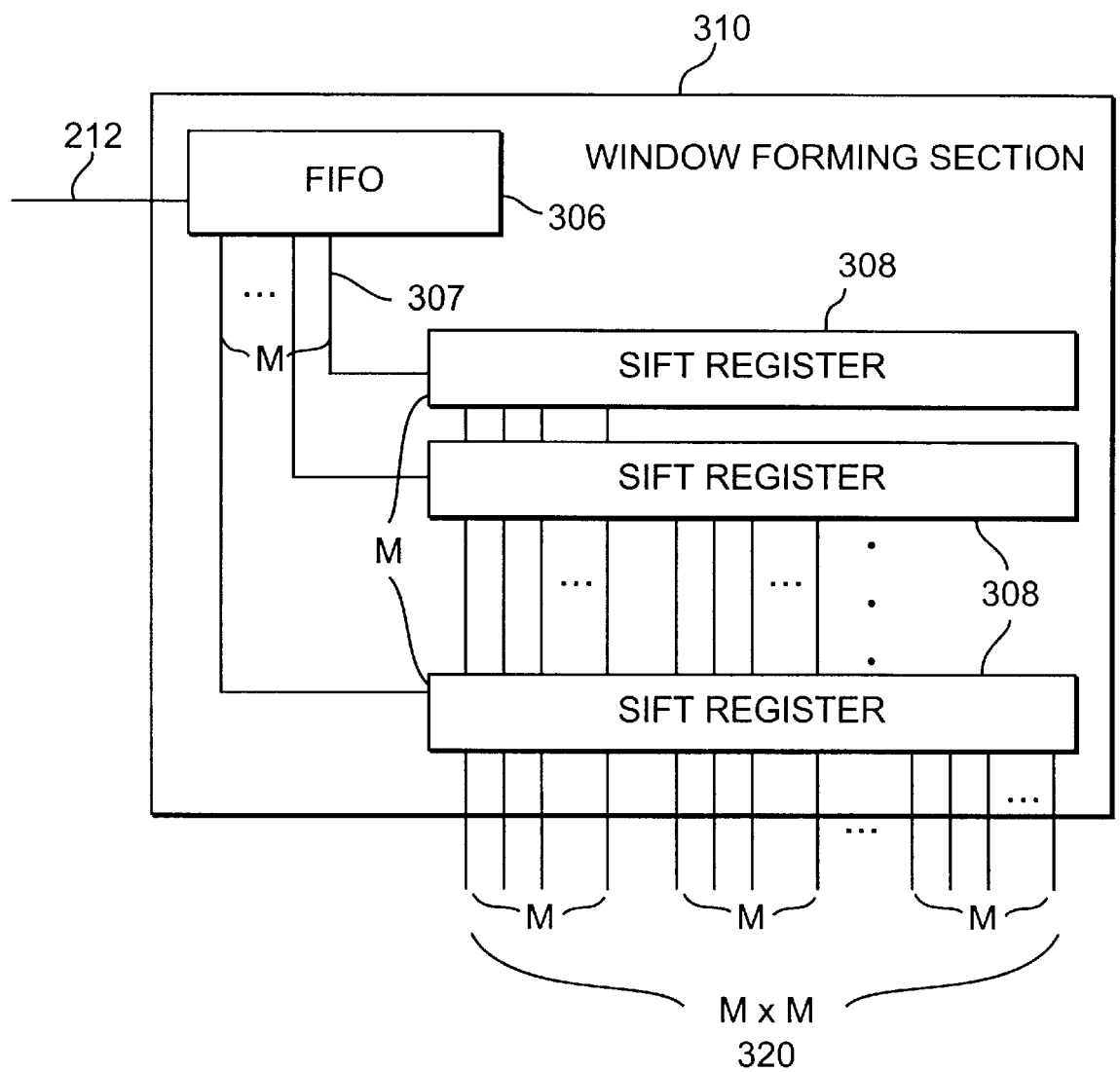
FIG. 6 is a block diagram of a window forming section according to the present invention.

FIG. 6 is a block diagram of the window forming section 310. In FIG. 6, the window forming section 310 is comprised of FIFO (First-in-First-out) 306 and M pieces of shift register 308. FIFO 306 temporarily stores M lines of the serial bit map data 212. M line signals 307 are sent to a corresponding sift register 308. Each shift register 308 temporarily stores M pixels of the line signal 307. By collecting output signals of each shift register 308, partial bit map signal 320 of (M×M) window 216 is extracted from the page memory.

Figure 7:
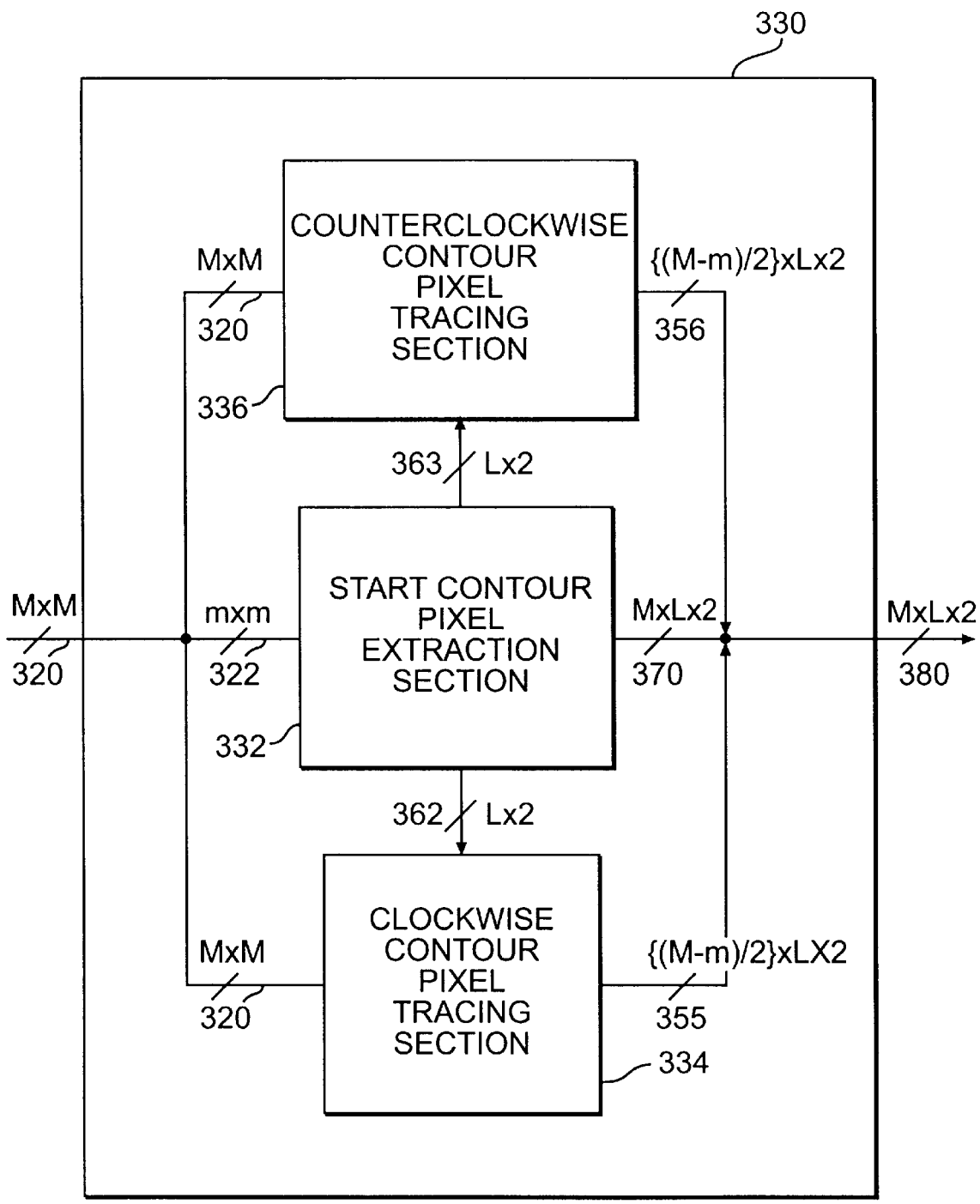
FIG. 7 is a block diagram of a smoothing signal generation section according to the present invention.

FIG. 7 is a block diagram of the contour extraction section 330. The contour extraction section 330 is comprised of a start contour pixel extraction section 332, a clockwise contour pixel tracing section 334, and a counterclockwise contour pixel tracing section 336. The start contour pixel extraction section 332 receives a small partial bit map signal of (m×m) pixels (in FIG. 5, m=3) of small window 217 which is a part of the partial bit map signal 320, extracts m points of the contour pixels (start contour pixel 364) neighboring the notice pixel 214, and outputs the coordinates of the contour pixels as a start contour pixel coordinate 370. In this case, assume that each start contour pixel 364 is defined as $P_i\{i=(M-m)/2+1, (M-m)/2+2, \ldots, (M-m)/2+m\}$ (in FIG. 5, $P_3\sim P_5$). The value of "i" increases in the order of tracing left round along the contour of the image. Values of the X-coordinate and Y-coordinate are an integer value 1~M. Therefore, in order to represent the X-coordinate and Y-coordinate of one start contour pixel 364, L pieces of signal lines (L: minimum integer x ($2^x$>M)) are necessary. "m×L×2" pieces of the signal lines are necessary in all of the start contour pixel coordinates 370.

One start contour pixel coordinate 370 whose number is smallest among the start contour pixels 364, i.e., a pointed end pixel (in FIG. 5, $P_3$) along the right round of the contour, is sent to the clockwise contour pixel tracing section 334 as the first coordinate of the clockwise origin pixel 362. In the same way, one start contour pixel coordinate 370 whose number is largest (in FIG. 3, $P_5$) is sent to the counterclockwise contour pixel tracing section 336 as the first coordinate of the counterclockwise origin pixel 363. The clockwise contour pixel tracing section 334 receives the partial bit map signal 320 and traces (M–m)/2 points of the clockwise contour pixel 365 along the contour clockwisely based on the first coordinate 362 of clockwise origin pixel. In the same way as the start contour pixel 364, the clockwise contour pixels 365 are called $P_i\{i=1, 2, \ldots, (M-m)/2\}$ (in FIG. 5, $P_1 \cdot P_2$). The value of "i" decreases in the order of tracing the contour clockwisely. Then, the coordinate 355 ($x_i$, $y_i$) of the clockwise contour pixel is outputted. The number of the clockwise contour pixel 365 is (M–m)/2. Therefore, {(M–m)/2×L×2} pieces of the signal line are necessary for the coordinates 365 of clockwise contour pixel.

In the same way, the counterclockwise contour pixel tracing section 336 receives the partial bit map signal 320 and traces (M–m)/2 points of the counterclockwise contour pixel 366 along the contour counterclockwisely based on the first coordinate 366 of the counterclockwise origin pixel. The counterclockwise contour pixels 363 are called $P_i\{i=(M-m)/2+1, (M-m)/2+2, \ldots, M\}$ (in FIG. 5, $P_6 \cdot P_7$). The value "i" increases in order of tracing along the counterclockwise of the contour. Then, the coordinate 356 ($x_i$, $y_i$) of the counterclockwise contour pixel is outputted. {(M–m)/2×L×2} pieces of the signal line are necessary for the coordinate 356 of the counterclockwise contour pixel.

Figure 8:
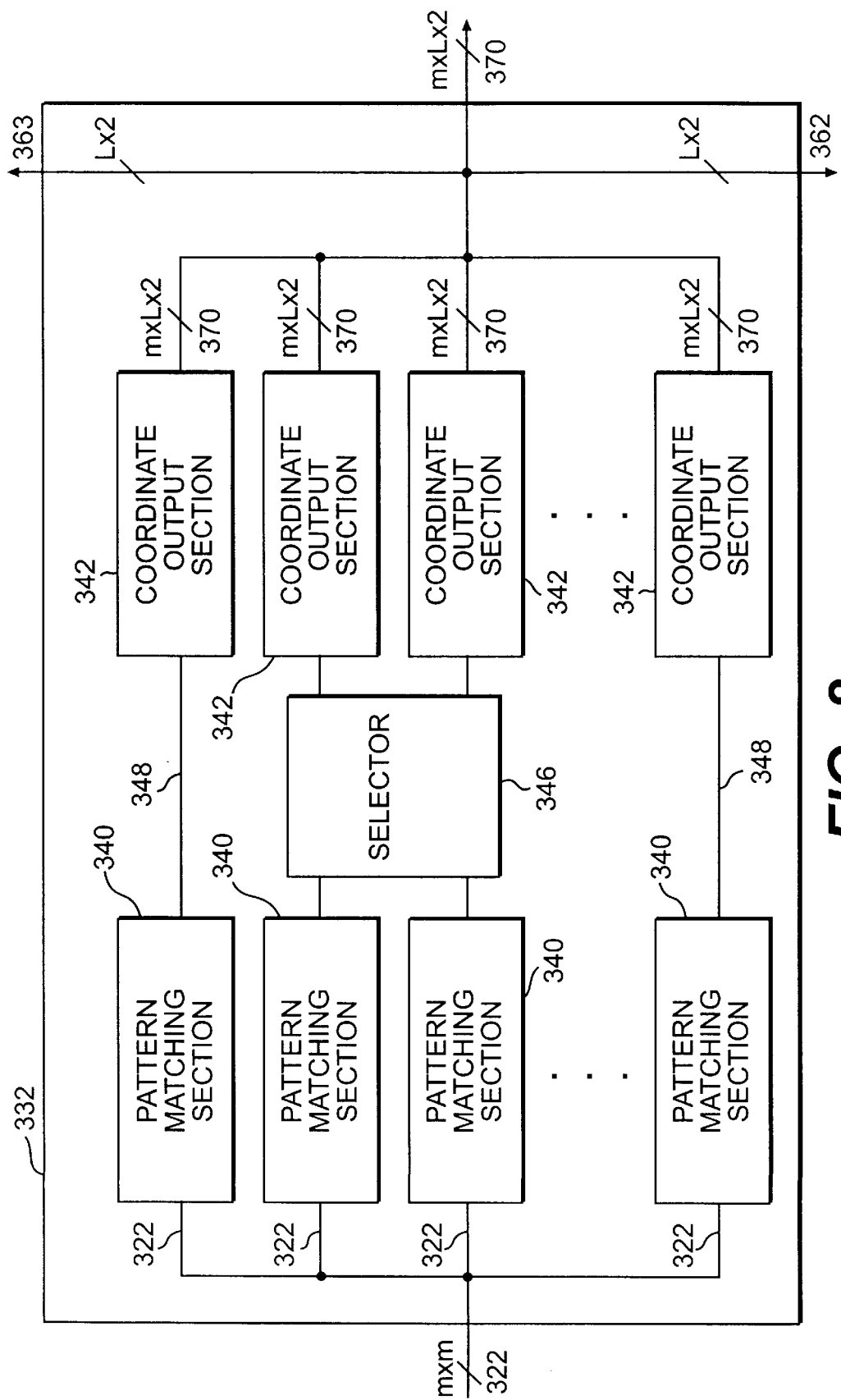
FIG. 8 is a block diagram of a start contour pixel extraction section according to the present invention.

FIG. 8 is a block diagram of the start contour pixel extraction section 322 in FIG. 7. The start contour pixel coordinate 370 is extracted by pattern matching. This pattern matching is executed by a small limit (for example, 3×3 pixels) neighboring the notice pixel, different from the prior art of pattern matching by a large limit (7×7 pixels). Therefore, every pattern is matched by a small scale circuit. The start contour pixel extraction section 332 is comprised of a plurality of pattern matching sections 340 and coordinate output sections 342, and a selector 346. The small partial bit map signal 322 is divided and supplied to each pattern matching section 340. The pattern matching section 340 includes one pattern of (m×m) pixels and outputs a coincidence signal 348 if the small partial bit map signal 322 matches the pattern. The coordinate output section 342 outputs the start contour pixel coordinate 370 in case the coincidence signal 348 is supplied. In other cases, a high-impedance signal is outputted. As mentioned-above, a part of the start contour pixel coordinate 370 is sent to the clockwise contour pixel tracing section 334 as the first coordinate 362 of the clockwise origin pixel and sent to the counterclockwise contour pixel tracing section 336 as the first coordinate 363 of the counterclockwise origin pixel.

Figure 9:
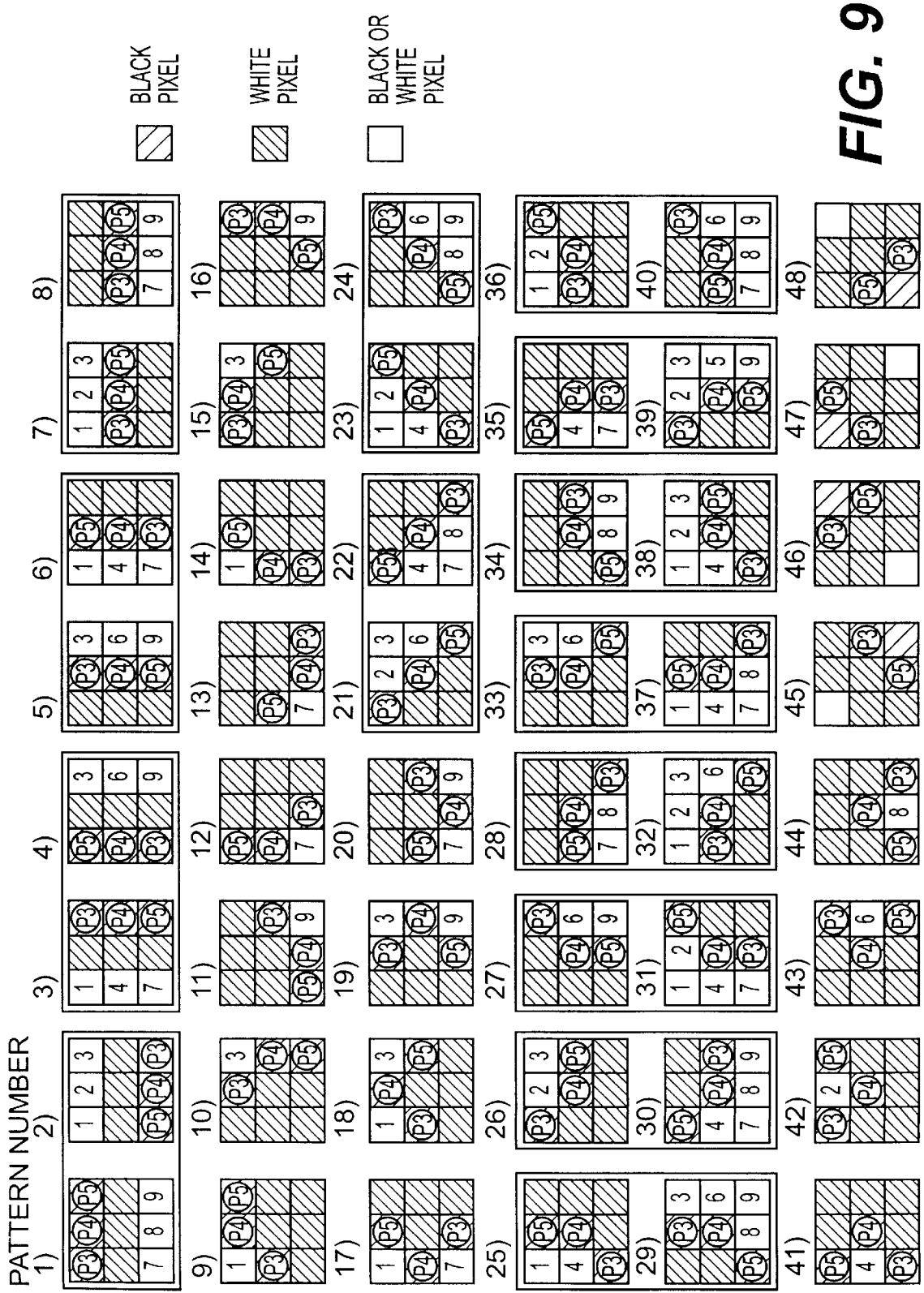
FIG. 9 is pattern examples to be used for contour extraction.

FIG. 9 shows the matching pattern and each start contour pixel. This pattern is comprised of 3×3 pixels whose center is the notice pixel 214, but pattern size is not limited to this example. A square containing left oblique lines, a square of right oblique lines, and a white square respectively represent black pixel, white pixel and free pixel. In the example of pattern 16, based on the position of the center pixel, the right upper pixel, right pixel, and lower pixel are black pixels. The left upper pixel, upper pixel, left pixel, left lower pixel, and center pixel are white pixels. The right lower pixel is a free pixel. It happens that the pairs of patterns surrounded by black lines (both patterns) coincide with the small partial bit map signal 322. For example, if the small partial bit map signal 322 is a pattern shown in FIG. 10, this bit map signal 322 coincides with two patterns 35, 39 in FIG. 9. The selector 346 inputs two coincidence signals 348 from two pattern matching sections 340 corresponding to the two patterns 35, 39, and selects one of the two coincidence signals 348 (the other signal is high-impedance). It is desired that one coincidence signal 348 for the pattern having a larger number of white pixels be selected (in FIG. 9, pattern 35).

Figure 11:
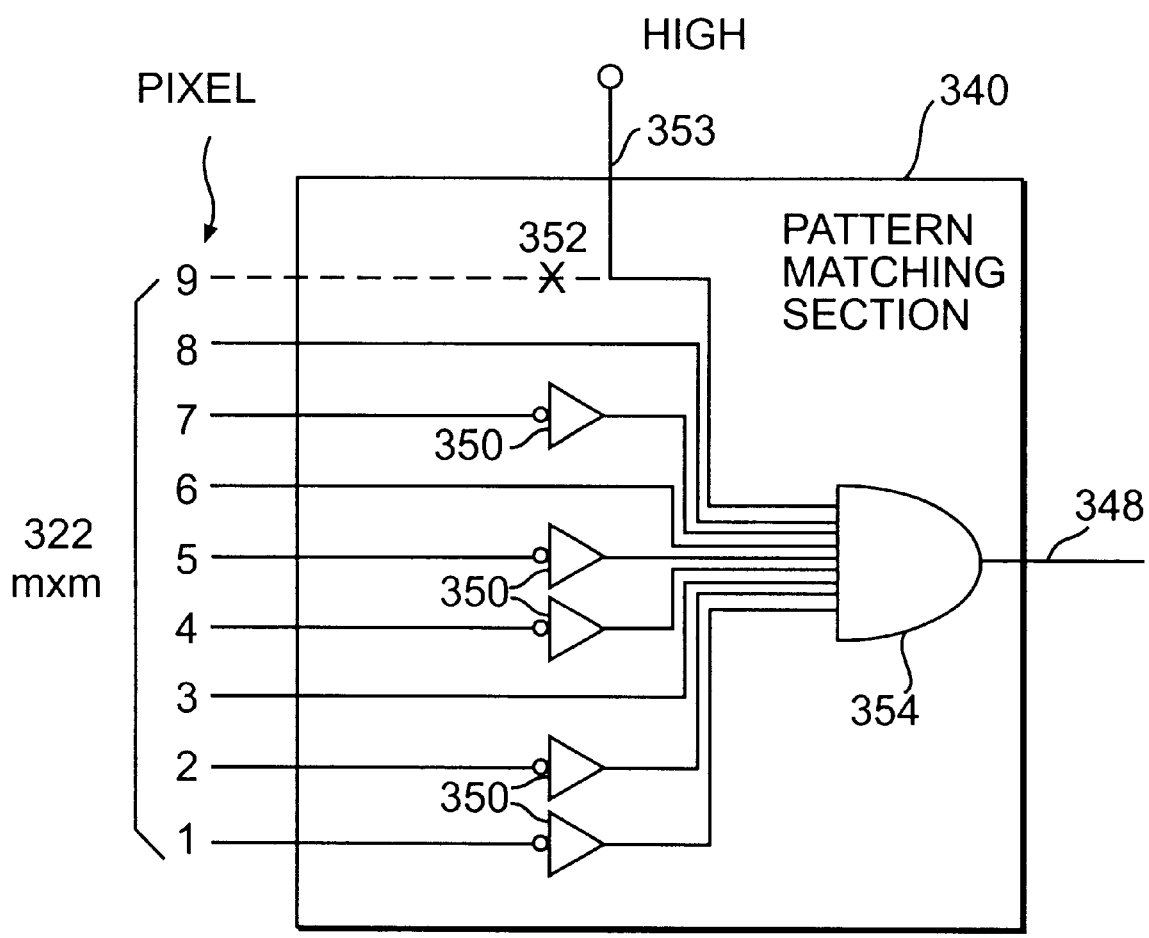
FIG. 11 is a block diagram of a pattern matching section according to the present invention.

FIG. 11 is a block diagram of the pattern matching section 340 of pattern 16 in FIG. 9. The pattern matching section 340 includes an inverter 350, a break-line section 352, a high signal output section 353, and a logical multiplication section 354 having nine inputs. As for the small partial bit map signal 322 of (m×m) pixels whose center is the notice pixel 214, each signal is high in the case of a black pixel and low in the case of a white pixel. The signal line of the white pixel is connected to the inverter 350. The signal line of free pixel is electrically isolated by the break-line section 352. In this case, the high signal is supplied from the High signal output section 353 to the logical product section 354. In FIG. 11, five signal lines of pixels 1, 2, 4, 5, 7, are connected to the inverter 350 and one signal line of the pixel 9 is connected to the break-line section 352. Last, the logical product section 354 calculates the multiplication of these signal lines and outputs the result as the coincidence signal 348.

Figure 12:
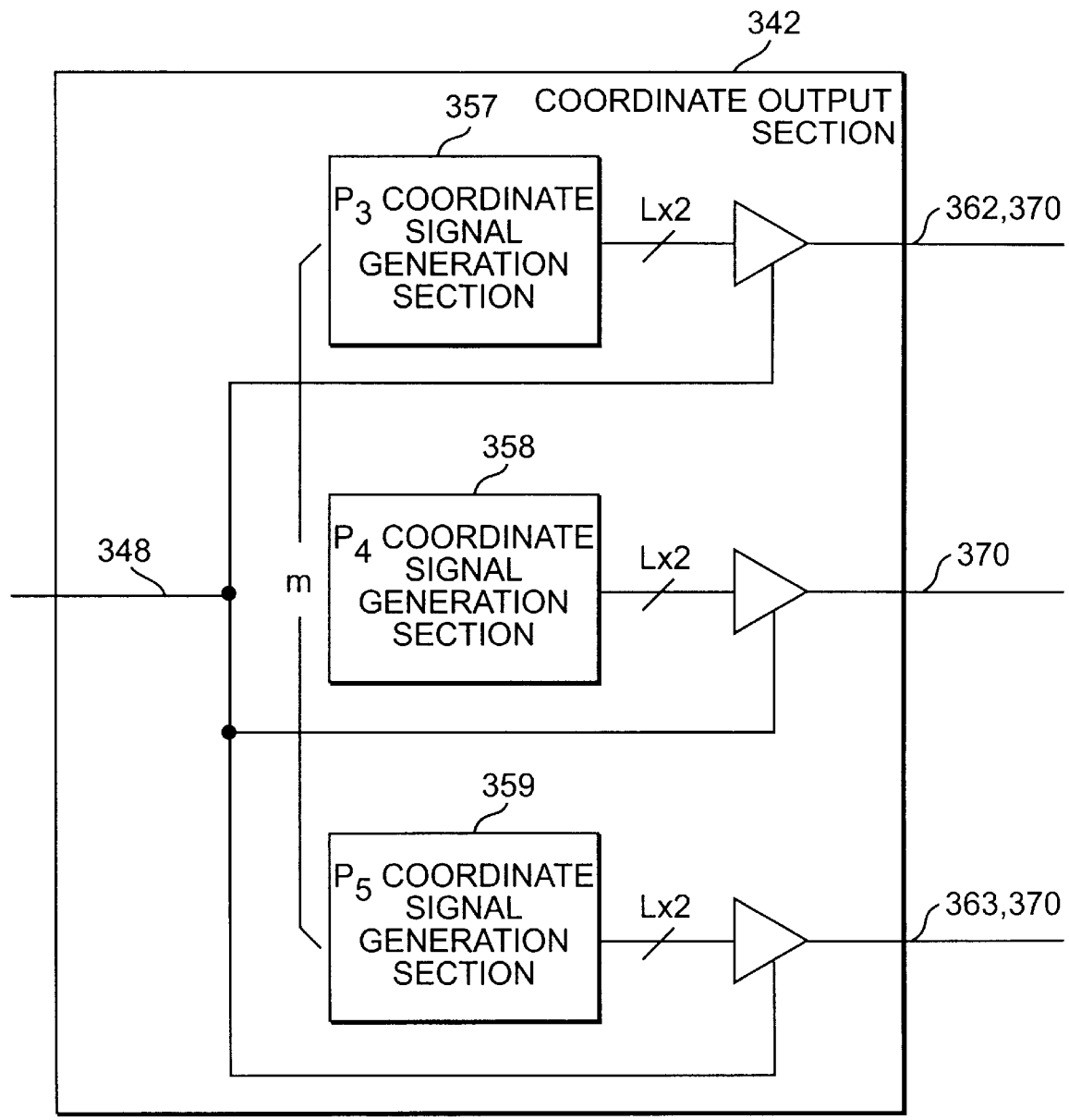
FIG. 12 is a block diagram of a coordinate output section according to the present invention.

FIG. 12 is a block diagram of the coordinate output section 342. The coordinate output section 342 includes m units (in FIG. 12, m=3) of coordinate signal generation sections 357, 358, 359 and outputs the start contour pixel coordinate 370 ((L×2) bits) corresponding to each pattern. The coincidence signal 348 is a gate signal, but it is a high-impedance signal in case of no coincidence signal. The P(M–m)/2+1 coordinate signal generation section 357(in FIG. 12, $P_3$) outputs the first coordinate 362 of the clockwise origin pixel, and the P(M–m)/2+m coordinate signal generation section 359(in FIG. 12, $P_5$) outputs the first coordinate 363 of the counterclockwise origin pixel.

Figure 13:
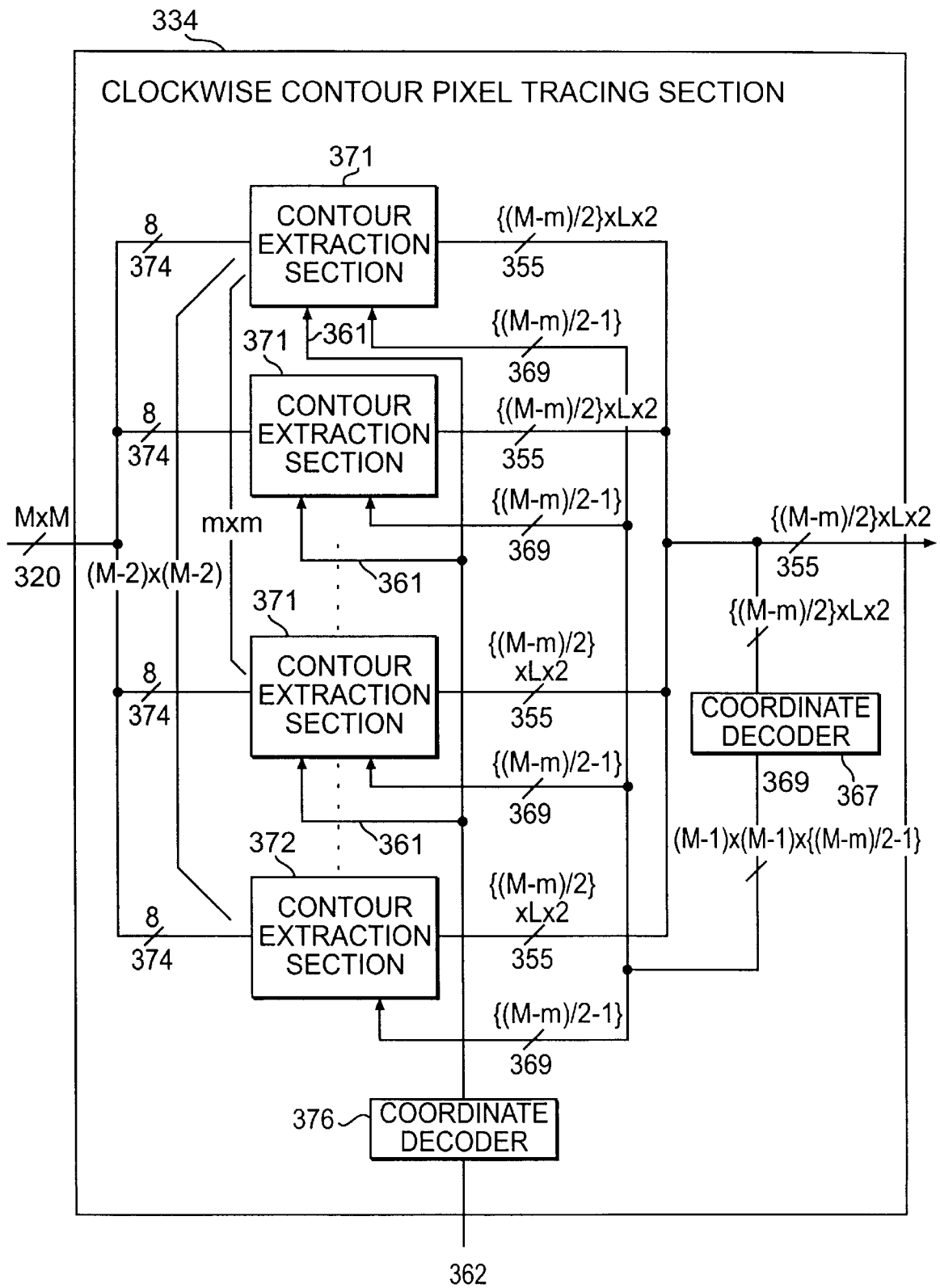
FIG. 13 is a block diagram of a clockwise contour pixel tracing section according to the present invention.

FIG. 13 is a block diagram of the clockwise contour pixel tracing section 334. In FIG. 13, the clockwise contour pixel tracing section 334 includes {(M–2)×(M–2)} pieces of contour extraction sections 371, 372. The contour extraction sections 371, 372 respectively correspond to each pixel P(u,v) {(u,v=2, 3, \ldots, (M–1)} of the window 213 of {(M–2)×(M–2)} pixels in FIG. 5. As for the contour extraction section 371, the corresponding pixel is located in small window 217 of (m×m) pixels in FIG. 5. As for the contour extraction section 372, the corresponding pixel is located outside of the small window 217. Each contour extraction section 371, 372 receives eight pixel signal 374 surrounding the corresponding pixel and the clockwise origin pixel signal 369. The number of signal lines of the clockwise origin pixel signal 369 is {(M–m)/2–1} and each signal line respectively corresponds to the n-th clockwise origin pixel signal {(n=

2,3, . . . , (M−m)/2}. Furthermore, the first coordinate 361 of the clockwise origin pixel is supplied to the contour extraction section 371 of (m×m) pixels in the window 217. The first coordinate 361 of the clockwise origin pixel is outputted by the coordinate decoder 376 by decoding the first coordinate 362 of the clockwise origin pixel from the start contour pixel extracion section 332. The first coordinate 361 of the clockwise origin pixel is not supplied to the contour extraction section 372 because the first coordinate 362 of the clockwise origin pixel is located in the small window 217 of (m×m) pixels. The contour extraction section 371, 372 respectively output {(M−m)/2} units of the clockwise contour pixel coordinates 355. The number of signal lines of each clockwise contour pixel coordinate is (L×2). Therefore, the total number of output signal lines from the contour extraction section 371, 372 is {(M−m)/2)×L×2}. Assume that number is assigned from the first coordinate to the {(M−m)/2} coordinate of clockwise contour pixel.

As for the clockwise origin pixel signal 369 inputted to the contour extraction section 371, 372, if the n-th clockwise origin pixel signal is "ON", one contour extraction section 371 (372) corresponding to the n-th clockwise origin pixel extracts a next clockwise contour pixel from eight pixel signals neighboring the n-th clockwise origin pixel and outputs the coordinate of the next clockwise contour pixel as (n+1)th clockwise contour pixel. The coordinate of the (n+1)th clockwise contour pixel is decoded by the coordinate decoder 367 and supplied to the contour extraction section 371 (372) corresponding to the (n+1)th clockwise origin pixel.

The relation of the clockwise contour pixel coordinate 355 and the clockwise origin pixel signal 369 is explained in detail by referring to FIG. 5 and FIG. 13. In three start contour pixels 364 of FIG. 5, a coordinate of the pointed end ($P_3$) along the contour clockwisely is the first coordinate 362 of the clockwise origin pixel. When this coordinate signal 362 is decoded by the coordinate decoder 376 in FIG. 13, a signal line connected to one contour extraction section 371 corresponding to pixel $P_3$ is only turned on. Therefore, the one contour extraction section 371 corresponding to pixel $P_3$ traces a pixel $P_2$ contouring to the pixel $P_3$ and outputs the coordinate of the pixel $P_2$ as the second coordinate of the clockwise contour pixel. In this case, outputs from other contour extraction sections 371, 372 are high-impedance. The second coordinate of the clockwise contour pixel is decoded by the coordinate decoder 367. A signal line connected to one contour extraction section 372 corresponding to the pixel P2 is turned on. In the same way, the one contour extraction section 372 traces the next pixel (in FIG. 5, $P_1$) contouring to the pixel $P_2$ and outputs the coordinate of the pixel $P_1$ as the third coordinate of the clockwise contour pixel. In this case, outputs from other contour extraction sections 371, 372 are high-impedance.

Figure 14:
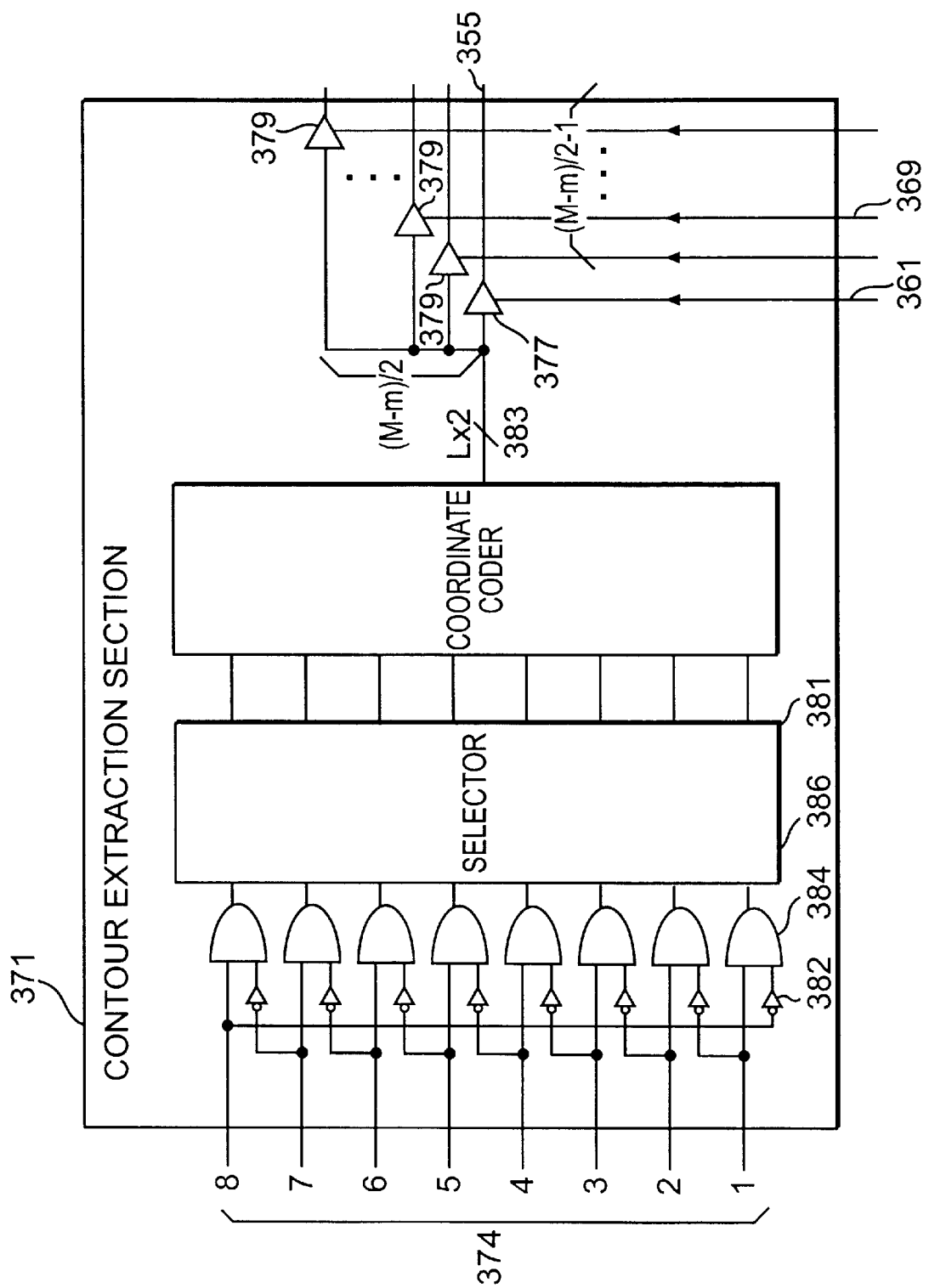
FIG. 14 is a block diagram of a contour extraction section according to the present invention.
Figure 15:
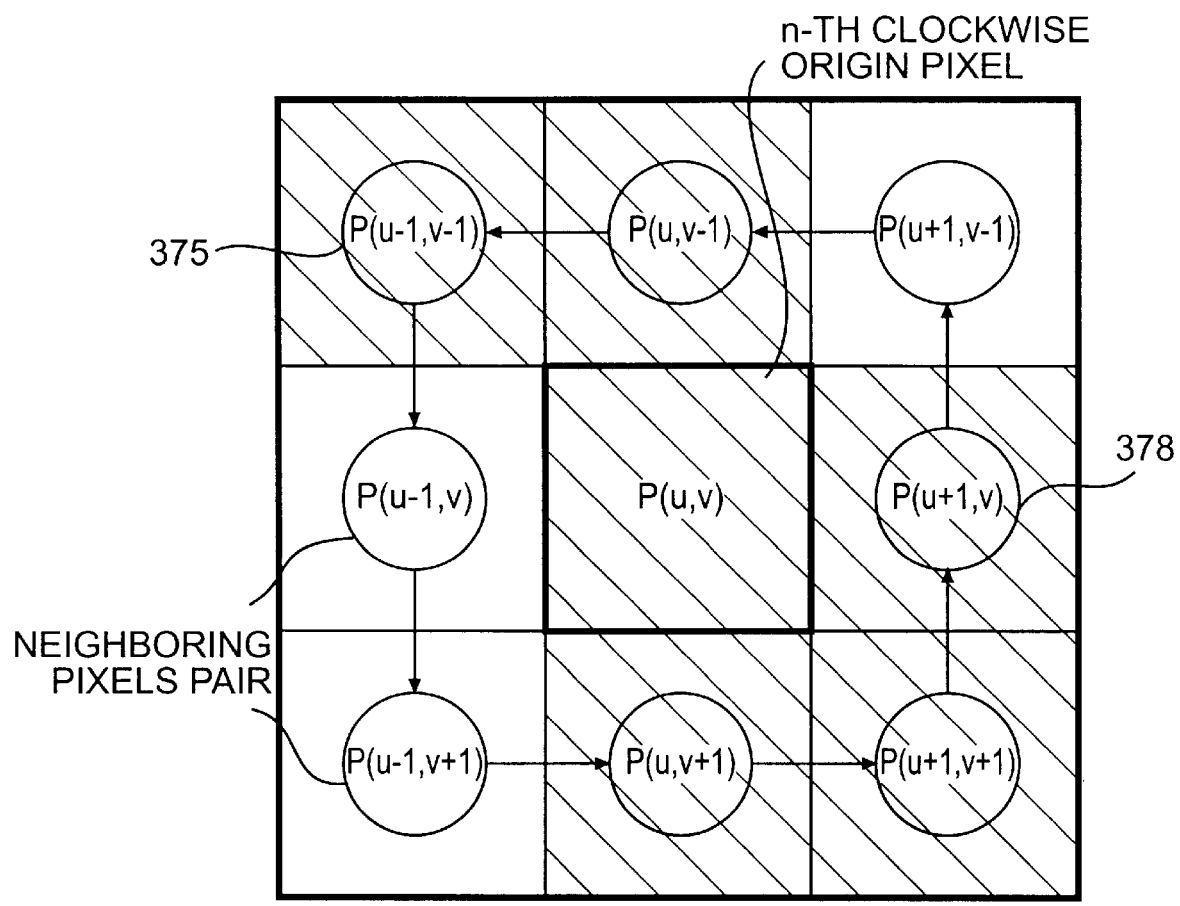
FIG. 15 is a schematic diagram of tracing the contour pixel clockwisely.

FIG. 14 is a block diagram of the contour extraction section 371 corresponding to pixel P(u, v) in the small window 217. As mentioned-above, eight pixel signals 374 neighboring the pixel P(u,v,) are {P(u−1,v−1), P(u+1,v−1), P(u+1,v−1), P(u−1,v), P(u+1,v), P(u−1,v+1), P(u,v+1), P(u+1,v+1)}. The logical multiplication section 384 calculates a logical product between each pixel signal 374 and respective neighboring pixel signal inverted by the inverter 382. As shown in FIG. 15, the neighboring pixel is respectively located along the counterclockwise direction based on an origin pixel P(u,v). The output from the logical multiplication section 384 is represented when the pixel is satisfied with the condition of clockwise contour pixel. The condition of a clockwise contour pixel is as follows.

(1) Being neighboring to the clockwise origin pixel.
(2) A black pixel
(3) A white pixel is located to the left when viewed from the clockwise origin pixel to the black pixel, i.e. the counterclockwise neighboring pixel is white.

The contour extraction section 371 in FIG. 14 outputs a pixel signal when the above three conditions are satisfied.

Next, the operation of the selector 386 in FIG. 14 is explained. When the eight pixels signal 374 shown in FIG. 15 is inputted and P(u,v) is the n-th clockwise origin pixel, the pixels satisfying the above three conditions are P(u−1, v−1) 375, P(u+1,v) 378. In this case, it is necessary to select one of two candidates. The selector 386 assigns priority order to each candidate and outputs one candidate whose priority is highest. The priority order of the eight pixels signal 374 is different by unit of the contour extraction section 371, 372, and it is determined by position of the corresponding pixel of the contour extraction section 371, 372 in the window 213. The priority of the pixel nearest to the notice pixel 214 is lowest and the priority order is incrementally raised along a counterclockwise direction around the origin pixel P(u,v) from a start pixel of the lowest priority.

Figure 16:
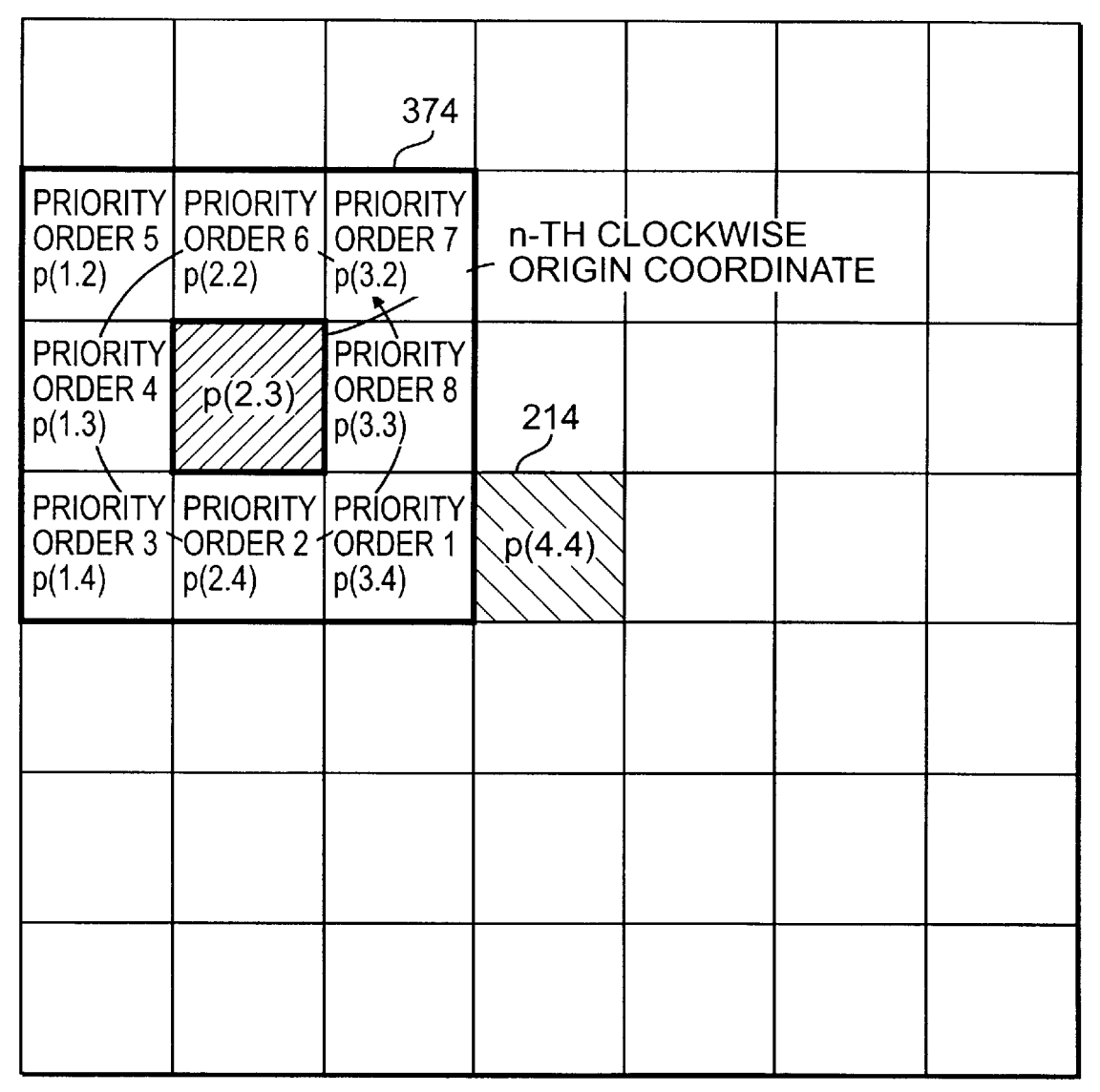

FIG. 16 shows the priority order of the contour extraction section 372 corresponding to P(2,3). In this case, the priority order of P(3,3) nearest to the notice pixel P(4,4) is lowest as 8, and the priority order increases along a counterclockwise direction. After the output signal of the logical product section 384 is passed through the selector 386, the output signal is converted into the coordinate value 383 by the coordinate coder 381. The coordinate values 383 {(M−m)/2 units} are respectively passed through a first clockwise pixel gate 377 and n-th clockwise contour pixel gate 379 {n=2,3, . . . , (M−m)/2} as the first contour pixel coordinate and the n-th clockwise contour pixel coordinate {n=2,3, . . . , (M−m)/2}. These comprise the clockwise contour pixel coordinate 355 {n=1,2, . . . , (M−m)/2}. In this place, the first clockwise origin pixel signal 361 is the gate signal for the first clockwise pixel gate 377 and the n-th clockwise origin pixel signal {n=2,3, . . . , (M−m)/2} is the gate signal for the n-th clockwise origin contour pixel gate 379. In the case where the contour extraction section 372 corresponds to a pixel outside the window 217, the first clockwise contour pixel gate 377 (the first clockwise origin pixel signal 361) is not included. Similar to the clockwise contour pixel tracing section 334, the counterclockwise contour pixel tracing section 336 traces a counterclockwise contour pixel 366 and outputs the counterclockwise contour pixel coordinate 356. In this case, a clockwise direction is used instead of a counterclockwise direction.

Figure 17:
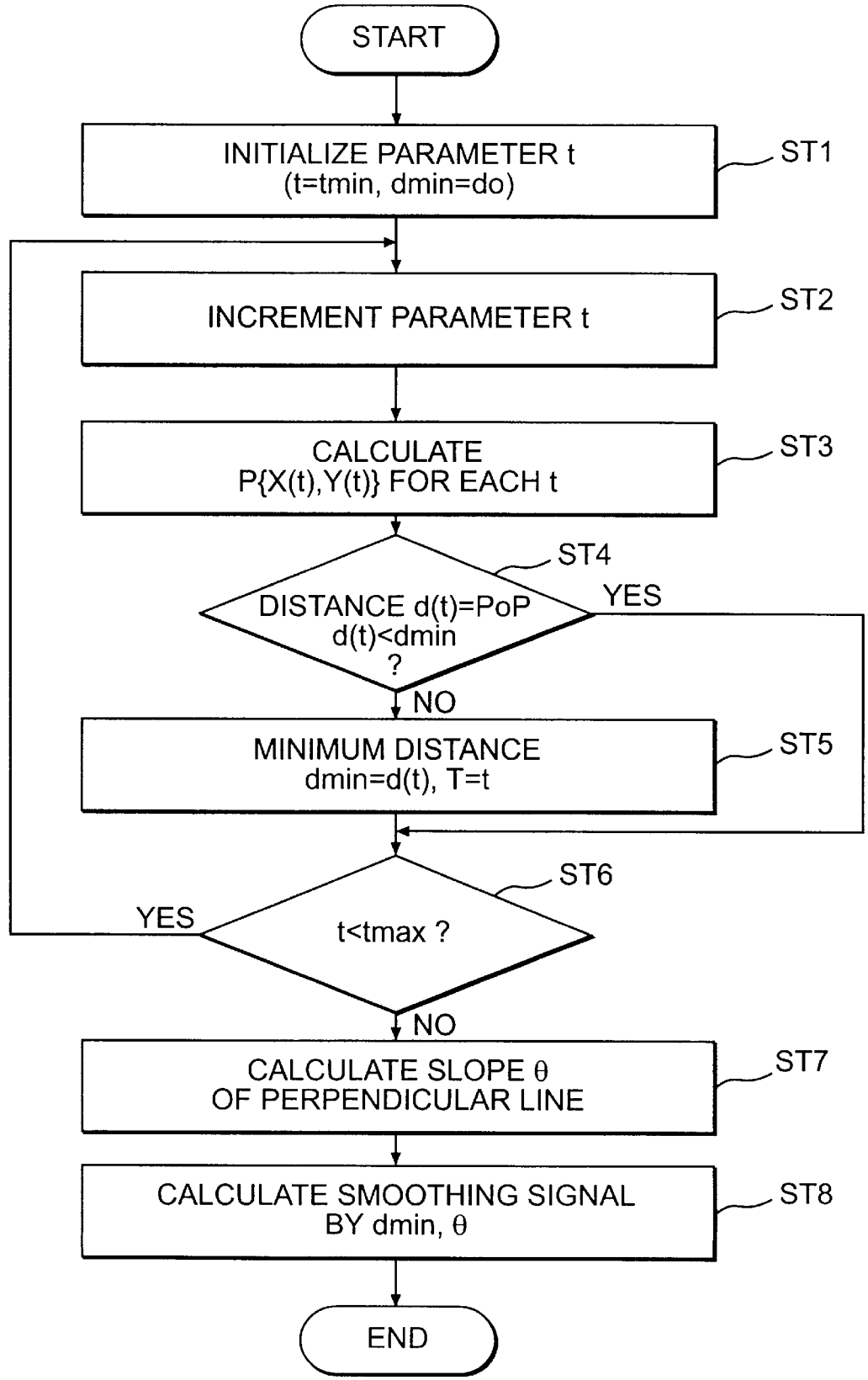
FIG. 17 is a flow chart of a process for generating the smoothing signal according to the present invention.
Figure 18:
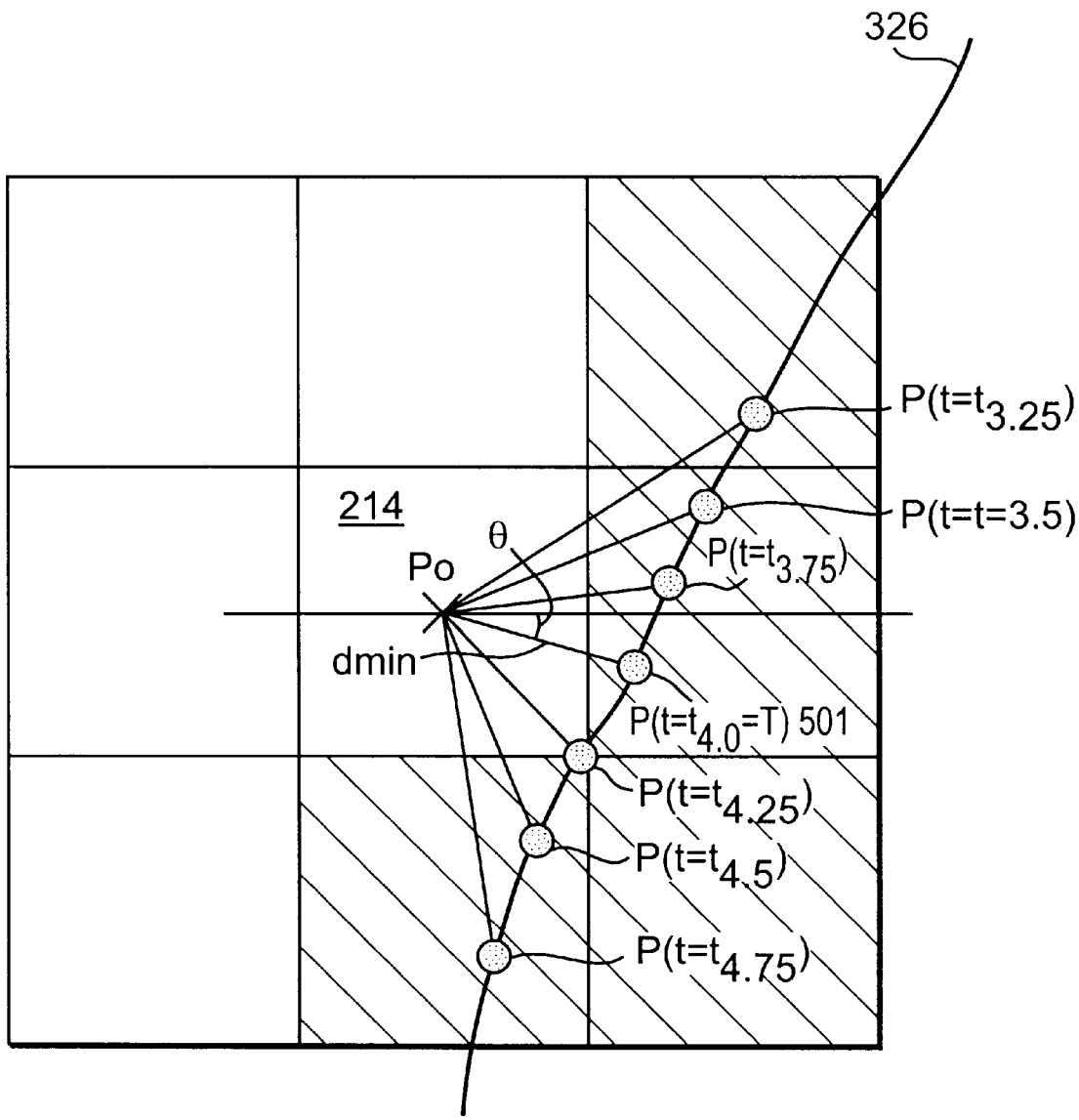
FIG. 18 is a schematic diagram showing a relation between the notice pixel and the outline.

FIG. 17 is a flow chart of the processing of the smoothing signal generation section 390. FIG. 18 is a schematic diagram showing the relation between the notice pixel and the outline. First, the parameter t is initialized (ST1). Next, whenever the parameter t is incremented by 1 (ST2), a coordinate of P{X(t), Y(t)} of each parameter t is calculated (ST3). Here, X(t) Y(t) is represented as follows ($B_{i,M}(t)$:B spline function).

$$X(t) = \sum_{i=1}^{M} B_{i,M}(t)^* X_i, \quad y(t) = \sum_{i=1}^{M} B_{i,M}(t)^* y_i \quad (1)$$

$$t_i = i;$$

$B_{i,1}(t)=1 (t_i \leq t<t_{i+1})$

0(t:other value)

$B_{i,k}(t)=(t-t_i)/(t_{i+k-1}-t_i)*B_{i,k-1}(t)+(t_{i+k-1})/(t_{i+k-1})*B_{i+1}(t)$,
(k>1)

B spline function is used for generating the outline smoothly and continuously by sample points (contour pixel coordinates 380). Assume that the notice pixel 214 is $P_o(x_o, y_o)$. As shown in FIG. 18, in P{x(t), y(t)} for each parameter t calculated by ST3, one point P{x(T), y(T)} {=P(t=T)} 501 nearest to Po is selected as the limit of (t<tmax), and the distance (dmin) is calculated (ST5, ST6, ST7). In this place, dmin is an almost perpendicular line between $P_o$ and the outline 326, and the slope θ of the perpendicular line is calculated as follows(ST8).

$$\theta = (y(T)-y0)/(x(T)-x0)$$

Figure 19:
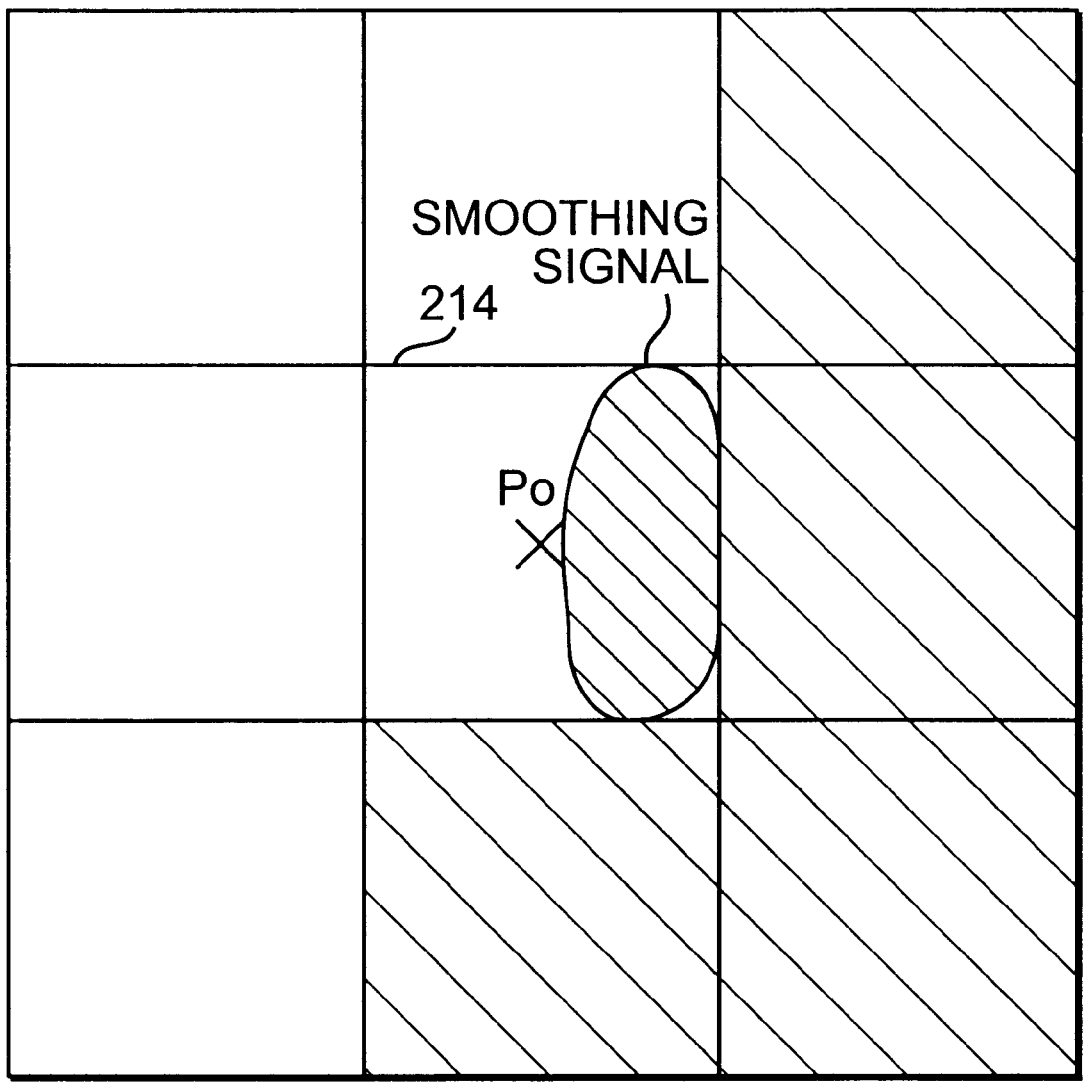
FIG. 19 is a schematic diagram of the smoothing signal generated in the notice pixel.

Last, the smoothing signal of the notice pixel is determined by dmin and the slope θ (ST9). In this case, the density (pulse width) of pixel is determined by the distance dmin, and the pulse phase (whether the pulse is actually plotted on right side, left side, or center of $P_o$) is determined by the slope θ. In the example of FIG. 18, the smoothing signal is outputted to smooth the contour of black pixels as shown in FIG. 19.

Figure 20:
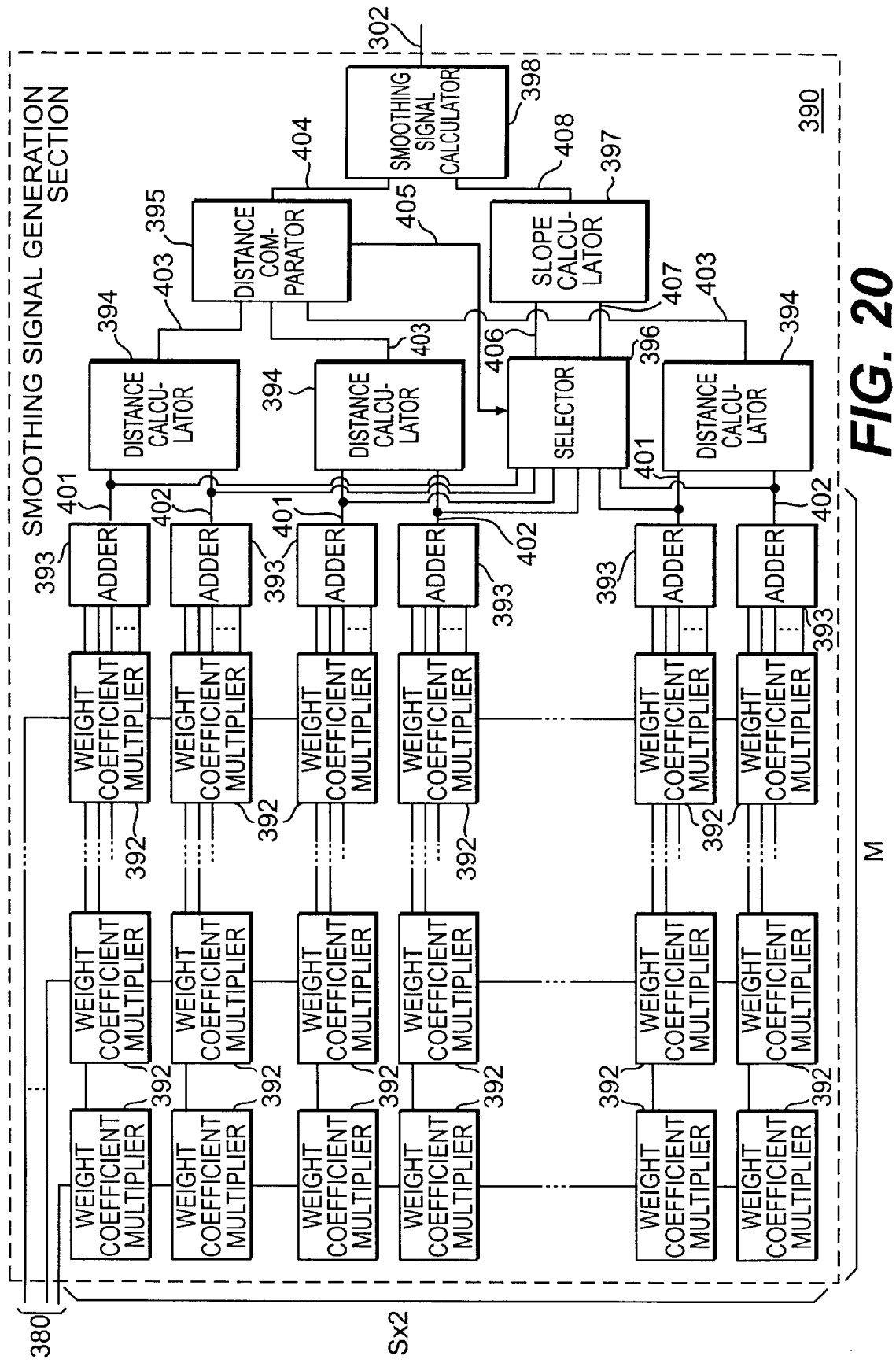
FIG. 20 is a block diagram of a smoothing signal generation section according to the present invention.

Bi, M(t) are high-order equations of the parameter t, and processing of the smoothing signal generation section 390 is suitable for software. However, in order to process at high speed, processing of the hardware is necessary. FIG. 20 is a block diagram of the smoothing signal generation section 390. The smoothing signal generation section 390 includes (M×S×2) units of weight coefficient multiplier 392 {S=($t_2$−$t_1$)/dt, $t_1$:maximum of t, $t_2$: minimum of t, dt: step width of t}, (S×2) units of adder 393, S units of distance calculator 394, distance comparator 395, selector 396, slope calculator 397, smoothing signal calculator 398. The weight coefficient multiplier 392 calculates $B_{i,M}(t)*X_i$ (i=1,2, ..., S) for each input $X_i$ (i=1,2, ..., M), or calculates $B_{i,M}(t)*Y_i$ (i=1,2, ..., S) for each input $Y_i$ (i=1,2, ..., M). In this place, $X_i, Y_i$, is represented by L bits (in case of M=7,L=3). Therefore, the weight coefficient multiplier 392 is packaged by a small scale LUT. The adder 393 calculates X(tj) and Y(tj) by unit of X-coordinate and Y-coordinate for each tj.

$$X(tj) = \sum_{i=1}^{M} B_{i,M}(tj)^* X_i \quad (401)$$

$$Y(tj) = \sum_{i=1}^{M} B_{i,M}(tj)^* Yi \quad (402)$$

X(tj)401·Y(tj)402 are inputted to the distance calculator 394. The distance calculator 394 calculates distance dj 403 for each tj by X(tj)·Y(tj). The distance comparator 395 selects dmin (tj=T) 404 which is the minimum of all dj and sends the dmin to the smoothing signal calculator 398. Furthermore, X(tj)·Y(tj) are inputted to the selector 396. The selector 396 selects X(T)406·Y(T)407 according to the comparison result 405 of the distance comparator 395, and sends X(T)·Y(T) to the slope calculator 397. The slope calculator 397 calculates the slop(θ) 408 according to X(T)·Y(T). The slope θ is inputted to the smoothing signal calculator 398. The smoothing signal calculator 398 generates the smoothing signal 302 according to dmin 404 and the slope (θ) 408.

In the above explanation, the outline information (dmin, θ) is calculated by spline curved line (contour coordinates).

However, if the scale of the circuit includes a restriction, the B spline function $B_{i,M}(t)$ may be approximated by a first-order equation of parameter t as follows.

$$B_{iM}(t) = (t - t_i + 2)/4 \quad (t_{i-2} \leq t < t_i)$$

$$= \{2 - (t - t_i)\}/4 \quad (t_i \leq t < t_{i+2})$$

$$= 0 \quad (t: \text{other value})$$

By using the above equation, dmin and slope θ are calculated by a simple calculation circuit without the weight coefficient multiplier 392 and the adder 393. In this case, the outline is not a curved line but a polygonal line approximated to the outline.

Figure 21:
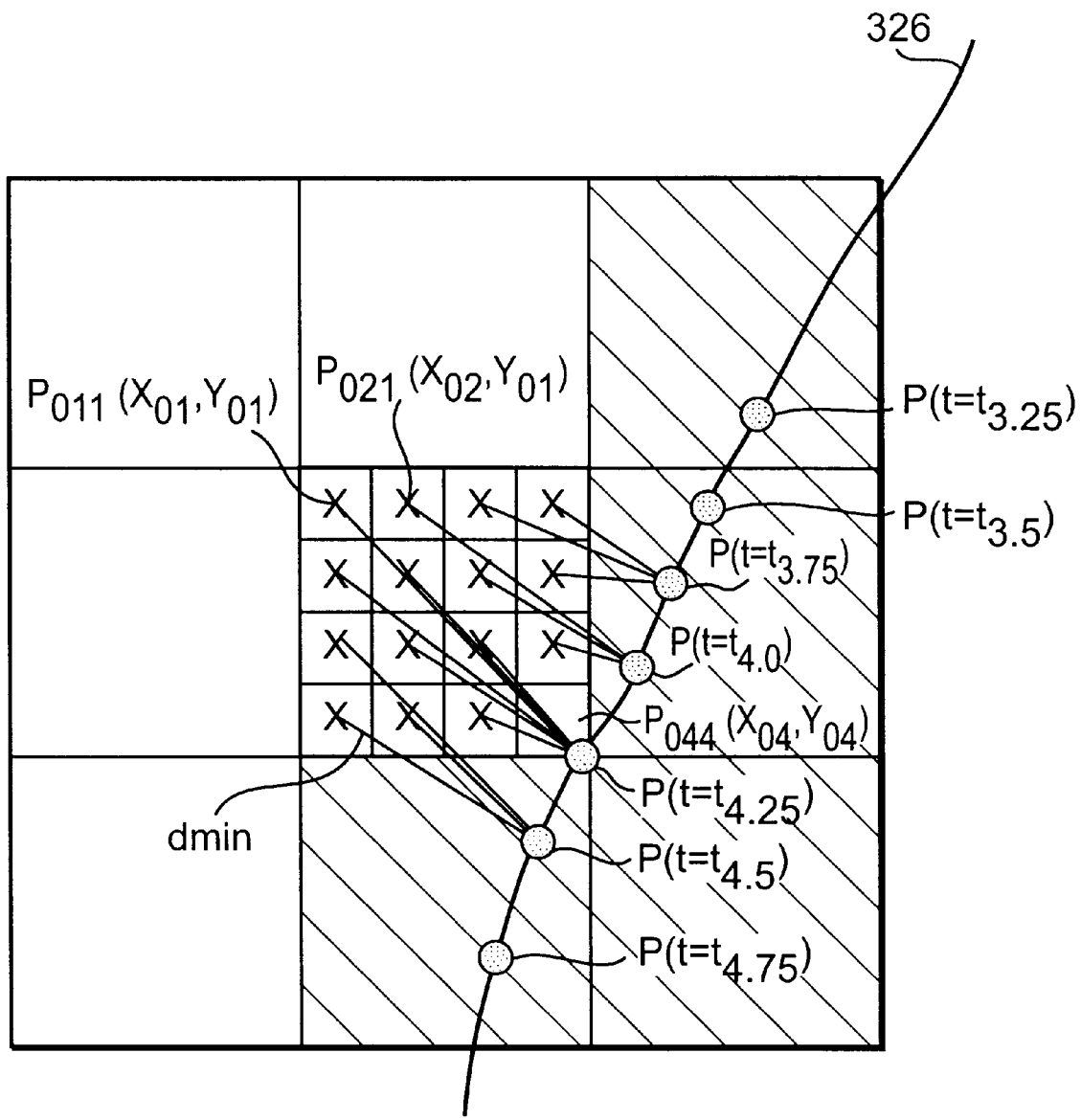
FIG. 21 is a schematic diagram showing the relation between the outline and each notice pixel whose density is converted.
Figure 22:
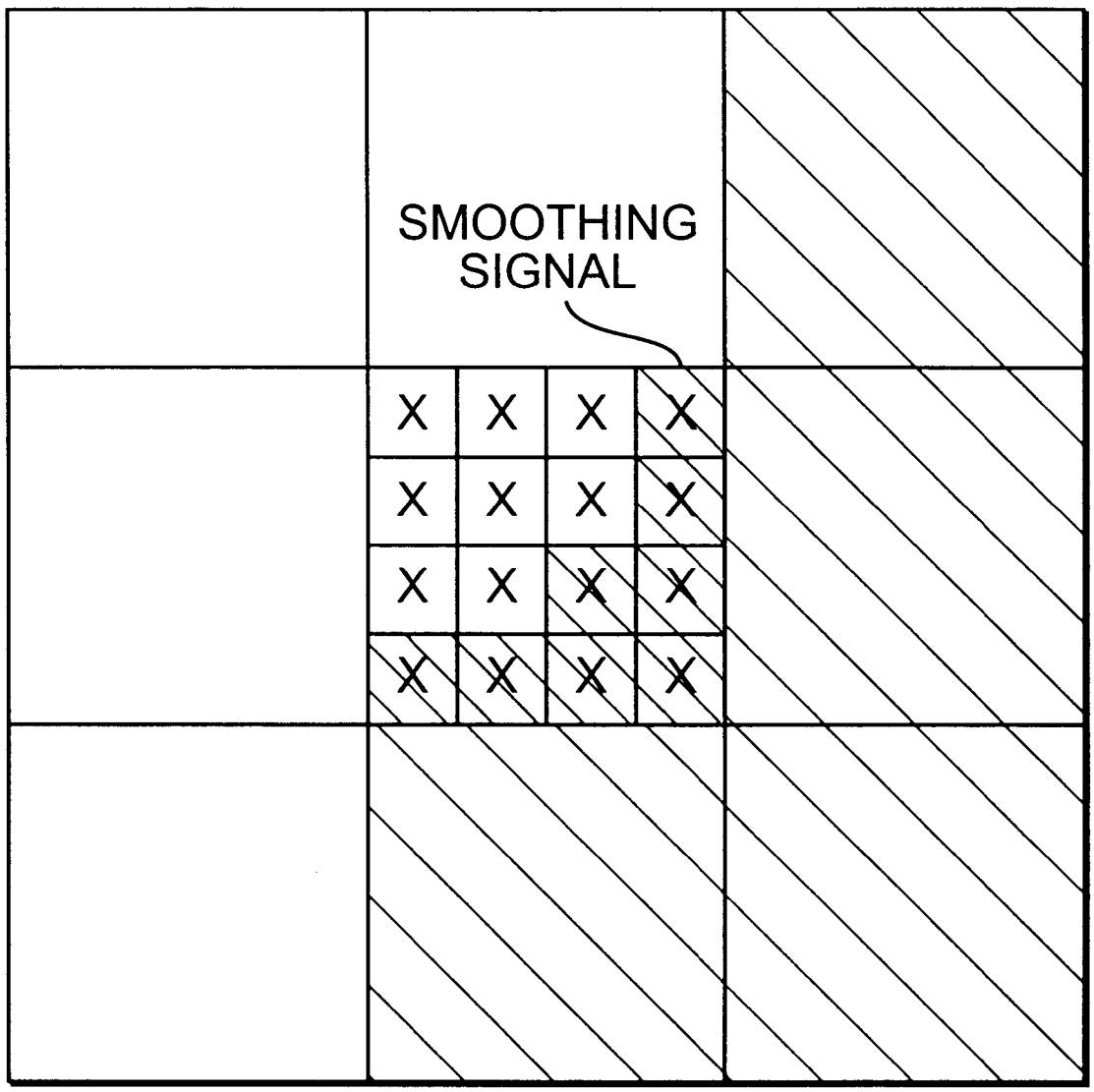
FIG. 22 is a schematic diagram of the smoothing signal for each notice pixel whose density is converted.

In the above embodiment, a binary bit map image is converted to a multivalue bit map image including multivalue signal such as a pulse width modulation. However, this processing is applied for conversion from a binary low resolution bit map image to a binary high resolution bit map image. FIG. 21 is a schematic diagram of a conversion to the binary bit map image of four times higher resolution. As mentioned-above, after the outline information 326 is generated, the distance from the notice pixel to the outline is calculated. In FIG. 18, the notice pixel is fixed as one point in the bit map image. However, in FIG. 21, one original notice pixel is converted to sixteen notice pixels $P_{011}$ ($X_{01}$, $Y_{01}$), ..., $P_{044}(X_{04},Y_{04})$ each with a different position. In this case, the distance (dmin) from each notice pixel to the outline is respectively calculated. The dmin of each notice pixel is compared with a threshold. If the dmin is below the threshold, the notice pixel is plotted as a black pixel. If the dmin is above the threshold, the notice pixel is plotted as a white pixel. Therefore, as shown in FIG. 22, the notice pixel nearest to the outline is only plotted as a black pixel. In this processing, the selector 396 and the slope calculator 397 in FIG. 20 are not necessary.

Figure 23:
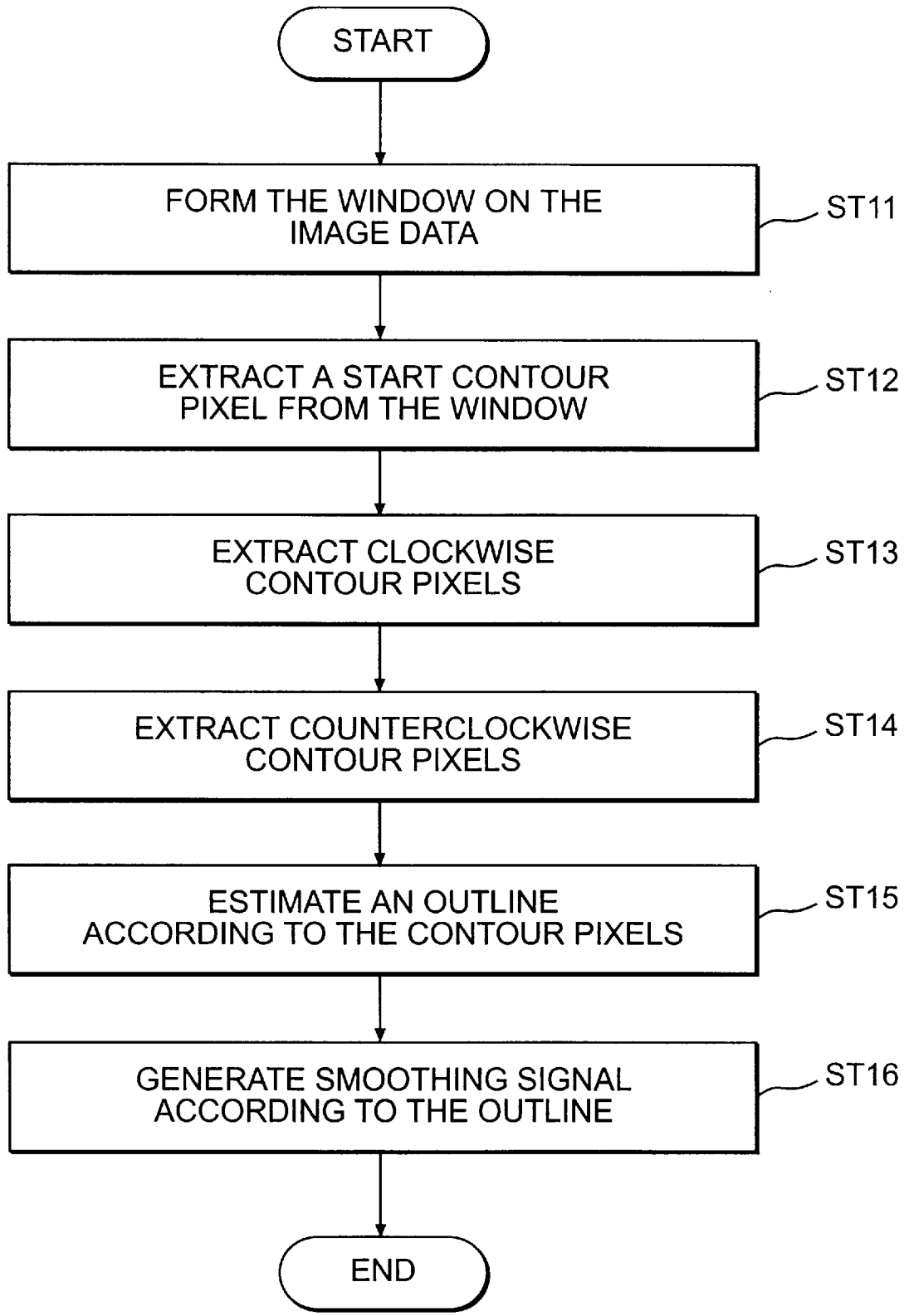
FIG. 23 is a flow chart of a process of the signal processing method to output the image according to a first embodiment of the present invention.

Next, a method for processing signals to output an image according to the present invention is explained. FIG. 23 is a flow chart of the processing of the method to output image according to the present invention. First, a window whose center is the notice pixel is extracted from the bit map data (ST11). A start contour pixel is extracted from the window (ST12). Based on the start contour pixel, the contour pixel is traced clockwisely and counterclockwisely. In this way, the clockwise contour pixels and the counterclockwise contour pixels are extracted (ST13, ST14). An outline is estimated according to the start contour pixel, the clockwise contour pixels and the counterclockwise contour pixels (ST15). Last, smoothing signal of the notice pixel is generated according to the relative position of the notice pixel and the outline (ST16). At step ST12, the window of (M×N) pixels whose center is the notice pixel is extracted. At step ST12, the start contour pixels of m points neighboring the notice pixel are extracted.

Figure 24:
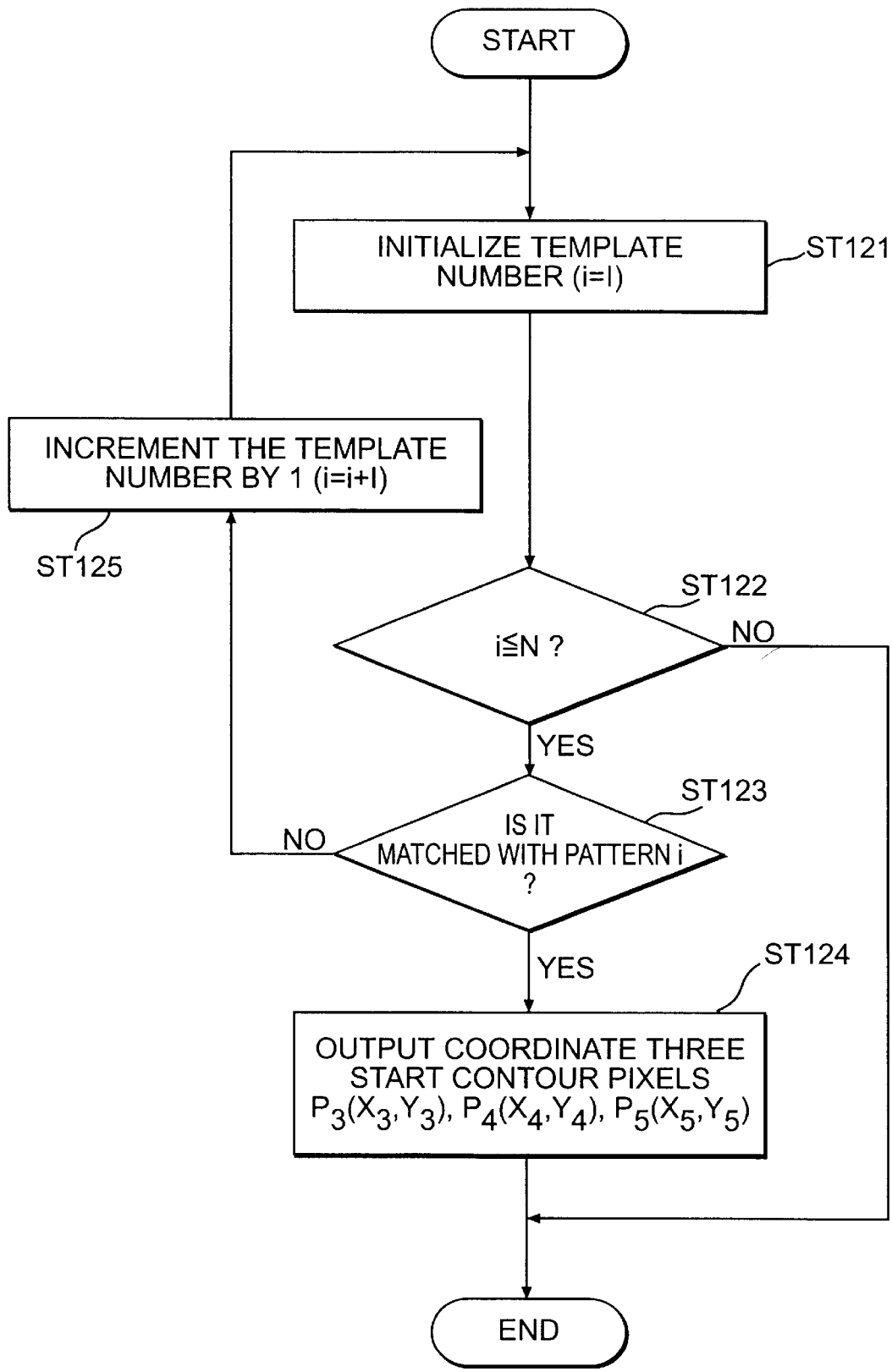
FIG. 24 is a flow chart of a process for extracting the start contour pixel according to the first embodiment of the present invention.

FIG. 24 is a flow chart of the detail processing of step ST12. In this processing of ST12, the pixel pattern neighboring the notice pixel is compared with N units of template patterns. First, template number i is initialized (i=1)(ST121). Next, the template number i is determined to be below N (ST122). If the template number i is not below N, processing is completed. If the template number i is below N, the pixel pattern is determined to be compared with the template pattern i(ST123). If the pixel pattern matches the template pattern i, the coordinates of three start contour pixels ($P_3$ ($X_3,Y_3$), $P_4(X_4,Y_4)$, $P_5(X_5,Y_5)$) are outputted (ST124). If the pixel pattern does not match the template pattern i, the template number i is incremented by 1 (ST125). Processing from ST121 to ST124 is repeated.

Figure 25:
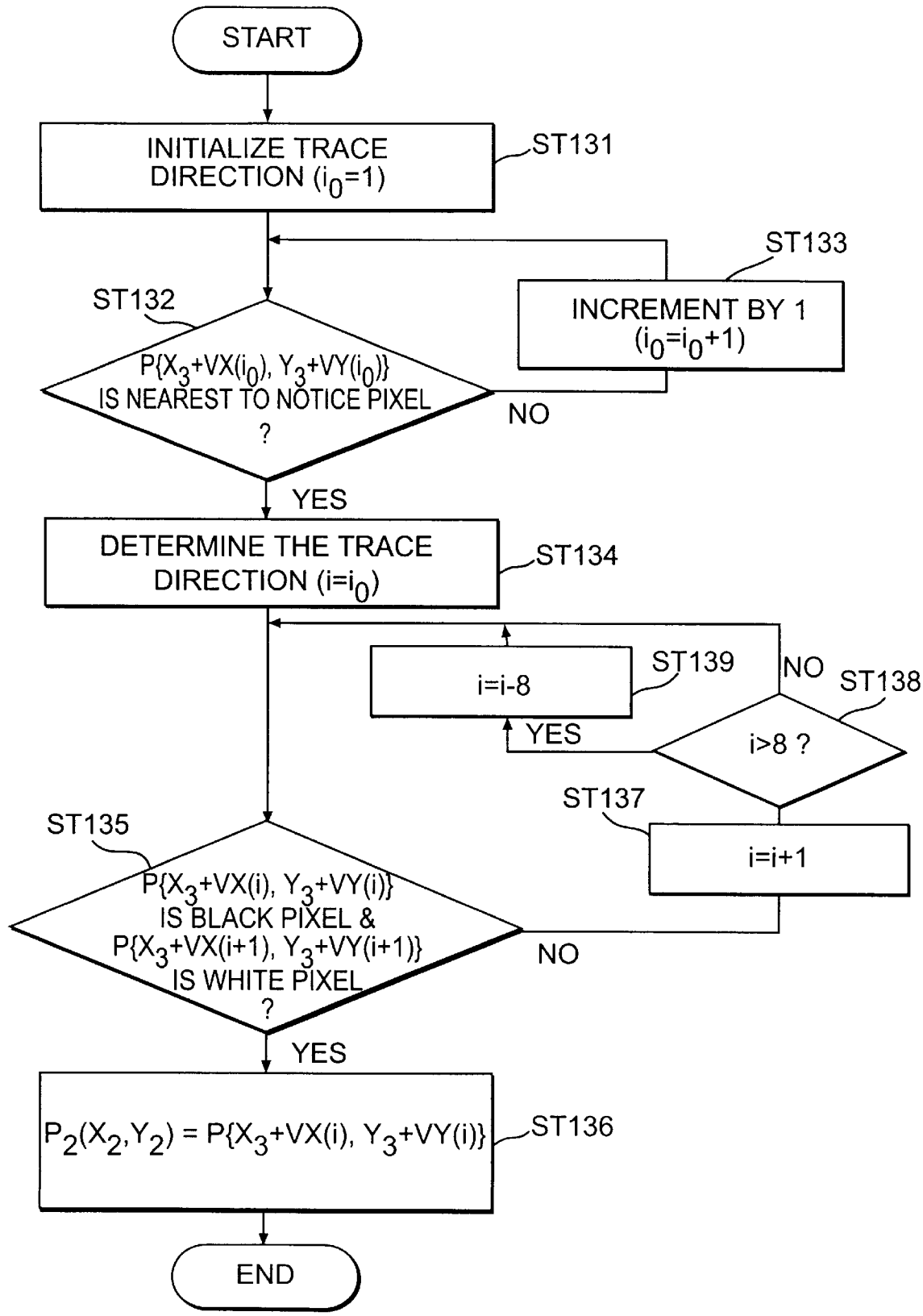
FIG. 25 is a flow chart of a process for extracting the contour pixels clockwisely and counterclockwisely according to the first embodiment of the present invention.

Returning to FIG. 23, at steps ST13 and ST14, the clockwise contour pixels and the counterclockwise contour pixels are respectively extracted as (M−m)/2 points. FIG. 25 is a flow chart of the detail processing of ST13 of FIG. 23. Assume that (M=5, m=3) as shown in FIG. 5. In this case, the contour is traced from $P_3(X_3,Y_3)$ which is pointed along the clockwise direction among three start contour pixels P3,P4,P5. In FIG. 25, trace direction $i_o$ is initialized ($i_0$=1) (ST131). Next, while the trace direction is changed in order, a direction $i_o$ toward the notice pixel is searched (ST132). Concretely speaking, based on the right round origin pixel $P_3(X_3,Y_3)$, neighboring pixel $P\{X_3+VX(i_0),Y_3+VY(i_0)\}$ is determined to be nearest to the notice pixel. If it is not so determined, the trace direction is incremented by $1(i_0=i_0+1)$(ST133) and processing of ST132 is repeated. If it is so determined, the trace direction is determined (i=$i_0$) (ST134). In this case, based on a start point of $i_0$, eight pixels neighboring $P_3(X_3,Y_3)$ are determined clockwisely in order when the condition of clockwise contour pixel is satisfied (ST135). If the condition is satisfied, the coordinate of the pixel is outputted as the next clockwise contour pixel $P_2(X_2,Y_2)$(ST136). If the condition is not satisfied, the pixel number is incremented by 1 (i=i+1)(ST137) and the incremented pixel number is determined to be above eight (ST138). If the incremented pixel number i is above eight, the pixel number is returned to one (ST139). If the incremented pixel number i is not above eight, processing of ST135 is repeated. In case of counterclockwise contour pixel, the same processing of FIG. 25 is repeated. However, two aspects are different. First, the contour is traced from $P_5(X_5,Y_5)$ which is pointed along left round direction among three start contour points $P_3,P_4,P_5$. Second, the eight pixels neighboring $P_5(X_5,Y_5)$ are determined in order of counterclockwise when the condition is satisfied.

Returning to FIG. 23, at step ST15, the outline is estimated by the start contour pixel, M points of the clockwise contour pixels, and the counterclockwise contour pixels. In the method for estimating the outline, the curved line or polygonal line of the B spline function is used to generate a smooth outline. At step ST16, the smoothing signal of the notice pixel is generated by the relative position relation of the outline and the notice pixel. As shown in FIG. 18, the relative position is determined by the distance dmin and the slope θ.

Figure 26:
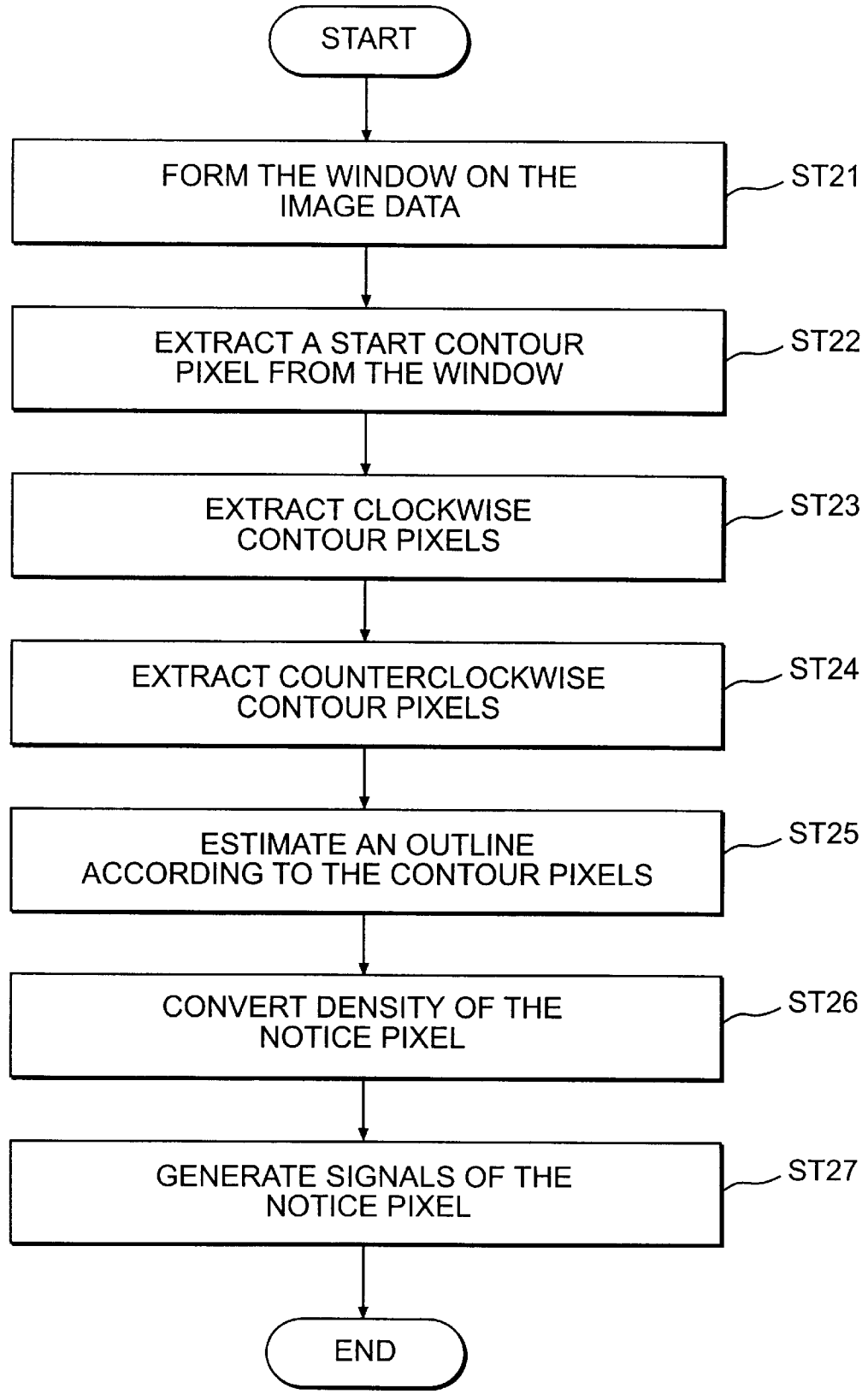
FIG. 26 is a flow chart of a process of the signal processing method to output the image according to a second embodiment of the present invention.

FIG. 26 is a flow chart of the processing of the signal processing method to output the image according to the second embodiment of the present invention. In FIG. 26, steps ST21~ST25 are the same as steps ST11~ST15 of FIG. 23. In this second embodiment, the pixel density of the bit map data is converted (ST26). Then, signals of the notice pixel are generated according to the relative position of the outline and the converted notice pixel. As shown in FIG. 21, for each converted notice pixel, the pixel signal is generated by using the distance between the position of the converted notice pixel and the outline.

As mentioned-above, in the present invention, arbitrary binary image is converted to a multivalue smoothing data or a binary smoothing data of high resolution. In short, an original image is converted to an high quality image by simple processing.

What is claimed is:

1. An image output apparatus, comprising:
   contour extraction means for extracting contour pixels from image data;
   outline estimation means for estimating an outline based on positions of the contour pixels; and
   smoothing signal generation means for generating a smoothing signal for a notice pixel of the image data based on a relative position of the notice pixel and the outline, the relative position being at least one of a distance from the notice pixel to the outline and a slope angle of a perpendicular line from the notice pixel to the outline, a size and a direction of the smoothing signal for the notice pixel being determined based on at least one of the distance and the slope angle.

2. The image output apparatus according to claim 1, further comprising a window forming means for extracting a window of image data including the notice pixel from bit map data of the image, wherein the contour pixels are extracted from the window.

3. The image output apparatus according to claim 1, wherein said contour extraction means includes a trace means for tracing the contour pixels neighboring the notice pixel.

4. The image output apparatus according to claim 3, wherein said trace means extracts one contour pixel neighboring the notice pixel as an origin pixel, and traces the contour pixels clockwisely and counterclockwisely based on the origin pixel.

5. The image output apparatus according to claim 3, said trace means being for storing a plurality of pixel patterns and contour pixel coordinates of each pixel pattern, and for respectively comparing the plurality of pixel patterns with a neighboring pixel pattern including the notice pixel.

6. The image output apparatus according to claim 5, wherein said trace means outputs the contour pixel coordinates of one pixel pattern matched with the neighboring pixel pattern.

7. The image output apparatus according to claim 6, wherein said trace means selects one of the contour pixel coordinates as clockwise origin pixel, and orderly extracts the next clockwise contour pixel connected to the clockwise origin pixel along clockwise direction according to condition of clockwise contour pixel.

8. The image output apparatus according to claim 6, wherein said trace means selects one of the contour pixel coordinates as counterclockwise origin pixel, and orderly extracts the next counterclockwise contour pixel connected to the counterclockwise origin pixel along a counterclockwise direction according to condition of counterclockwise contour pixel.

9. The image output apparatus according to claim 1, wherein said outline estimation means adapts a spline curved line to coordinate points of the contour pixels to generate the outline.

10. An image output apparatus, comprising:
    contour extraction means for extracting contour pixels from image data;
    outline estimation means for estimating an outline based on positions of the contour pixels; and
    pixel density conversion means for converting a notice pixel of the image data into high resolution notice pixels, and for generating a signal for a high resolution notice pixel based on a relative position of each high resolution notice pixel and the outline, the relative position being at least one of a distance from the each high resolution notice pixel to the outline and a slope angle of a perpendicular line from the each high resolution notice pixel to the outline, the high resolution notice pixel to be generated the signal being selected from all high resolution notice pixels based on at least one of the distance and the slope angle.

11. The image output apparatus according to claim 10, further comprising a window forming means for extracting a window of image data including the notice pixel from bit map data of the image, wherein the contour pixels are extracted from the window.

12. The image output apparatus according to claim 11, wherein said contour extraction means includes trace means for tracing the contour pixels neighboring the notice pixel.

13. The image output apparatus according to claim 12, wherein said trace means extracts one contour pixel neighboring the notice pixel as an origin pixel, and traces the contour pixels clockwisely and counterclockwisely based on the origin pixel.

14. The image output apparatus according to claim 12, said trace means being for storing a plurality of pixel patterns and contour pixel coordinates of each pixel pattern, and for respectively comparing the plurality of pixel patterns with a neighboring pixel pattern including the notice pixel.

15. The image output apparatus according to claim 14, wherein said trace means outputs the contour pixel coordinates of one pixel pattern matched with the neighboring pixel pattern.

16. The image output apparatus according to claim 15, wherein said trace means selects one of the contour pixel coordinates as clockwise origin pixel, and orderly extracts the next clockwise contour pixel connected to the clockwise origin pixel along clockwise direction according to condition of clockwise contour pixel.

17. The image output apparatus according to claim 15, wherein said trace means selects one of the contour pixel coordinates as counterclockwise origin pixel, and orderly extracts the next counterclockwise contour pixel connected to the counterclockwise origin pixel along a counterclockwise direction according to condition of counterclockwise contour pixel.

18. The image output apparatus according to claim 10, wherein said outline estimation means adapts a spline curved line to coordinate points of the contour pixels to generate the outline.

19. Data processing method to output an image, comprising the step of:
 extracting contour pixels from image data;
 estimating an outline based on positions of the contour pixels; and
 generating a smoothing signal for a notice pixel of the image data based on a relative position of the notice pixel and the outline, the relative position being at least one of a distance from the notice pixel to the outline and a slope angle of a perpendicular line from the notice pixel to the outline, a size and a direction of the smoothing signal for the notice pixel being determined based on at least one of the distance and the slope angle.

20. Data processing method to output an image, comprising the step of:
 extracting contour pixels from image data;
 estimating an outline based on the positions of the contour pixels;
 converting a notice pixel of the image data into high resolution notice pixels; and
 generating a signal for a high resolution notice pixel based on a relative position of each high resolution notice pixel and the outline, the relative position being at least one of a distance from the each high resolution notice pixel to the outline and a slope angle of a perpendicular line from the each high resolution notice pixel to the outline, the high resolution notice pixel to be generated the signal being selected from all high resolution notice pixels based on at least one of the distance and the slope angle.

21. An image output apparatus, comprising:
 contour extraction means for storing a plurality of pixel patterns and contour pixel coordinates of each pixel pattern, for respectively comparing the plurality of pixel patterns with a neighboring pixel pattern including a notice pixel in image data, and for outputting the contour pixel coordinates of one pixel pattern matched with the neighboring pixel pattern;
 outline estimation means for estimating an outline based on positions of the contour pixel coordinates; and
 smoothing signal generation means for generating a smoothing signal for the notice pixel based on a relative position of the notice pixel and the outline.

22. An image output apparatus, comprising:
 contour extraction means for storing a plurality of pixel patterns and contour pixel coordinates of each pixel pattern, for respectively comparing the plurality of pixel patterns with a neighboring pixel pattern including a notice pixel in image data, and for outputting the contour pixel coordinates of one pixel pattern matched with the neighboring pixel pattern;
 outline estimation means for estimating an outline based on positions of the contour pixel coordinates; and
 pixel density conversion means for converting a notice pixel of the image data into high resolution notice pixels, and for generating a signal for the high resolution notice pixel based on a relative position of each high resolution notice pixel and the outline.

23. Data processing method to output an image, comprising the step of:
 storing a plurality of pixel patterns and contour pixel coordinates of each pixel pattern;
 comparing each of the plurality of pixel patterns with a neighboring pixel pattern including a notice pixel in image data;
 outputting the contour pixel coordinates of one pixel pattern matched with the neighboring pixel pattern;
 estimating an outline based on positions of the contour pixel coordinates; and
 generating a smoothing signal for the notice pixel based on a relative position of the notice pixel and the outline.

24. Data processing method to output an image, comprising the step of:
 storing a plurality of pixel patterns and contour pixel coordinates of each pixel pattern;
 comparing each of the plurality of pixel patterns with a neighboring pixel pattern including a notice pixel in image data;
 outputting the contour pixel coordinates of one pixel pattern matched with the neighboring pixel pattern;
 estimating an outline based on positions of the contour pixel coordinates;
 converting a notice pixel of the image data into high resolution notice pixels; and
 generating a signal for the high resolution notice pixel based on a relative position of each high resolution notice pixel and the outline.

* * * * *